US012592396B2

(12) United States Patent
Gallmeier et al.

(10) Patent No.: US 12,592,396 B2
(45) Date of Patent: Mar. 31, 2026

(54) LASER-SURFACE-TREATED SEPARATOR PLATE, METHOD FOR PRODUCING SAME, AND METHODS FOR CHARACTERIZING SAME

(71) Applicant: Reinz-Dichtungs-GmbH, Neu-Ulm (DE)

(72) Inventors: Edda Gallmeier, Neu-Ulm (DE); Bernd Gaugler, Ulm (DE); Sebastian Scheeler, Stuttgart (DE); Stephan Wenzel, Pfaffenhofen (DE); Lisa Jerg, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 725 days.

(21) Appl. No.: 17/930,944

(22) Filed: Sep. 9, 2022

(65) Prior Publication Data

US 2023/0085491 A1     Mar. 16, 2023

(30) Foreign Application Priority Data

Sep. 9, 2021    (DE) ..................... 10 2021 209 997.1

(51) Int. Cl.
    *H01M 8/0206*      (2016.01)
    *B23K 26/0622*      (2014.01)
    *H01M 8/0247*      (2016.01)
(52) U.S. Cl.
    CPC ....... *H01M 8/0206* (2013.01); *B23K 26/0622* (2015.10); *H01M 8/0247* (2013.01)

(58) Field of Classification Search
None
See application file for complete search history.

(56) References Cited

U.S. PATENT DOCUMENTS

| | | | | |
|---|---|---|---|---|
| 9,680,162 B2 * | 6/2017 | Kaminaka | ............... | C22C 38/44 |
| 12,057,608 B2 * | 8/2024 | Gaugler | .............. | H01M 8/0228 |
| 2006/0257555 A1 * | 11/2006 | Brady | ................ | H01M 8/0206 |
| | | | | 427/115 |
| 2014/0030632 A1 * | 1/2014 | Larsen | ................ | H01M 8/0228 |
| | | | | 429/535 |
| 2016/0056479 A1 * | 2/2016 | Itsumi | ...................... | C22F 1/02 |
| | | | | 148/501 |

(Continued)

OTHER PUBLICATIONS

Höhm, S., "Dynamik der Erzeugung und Mechanismen der Entstehung von periodischen Oberflächenstrukturen im Nanometerbereich (LIPSS) durch die Bestrahlung von Festkörpern mit Femtosekunden-Laserpulsen," PHD Thesis, Technical University of Berlin, Faculty II—Mathematics and Natural Sciences, Dec. 8, 2014, 125 pages. (Submitted with Machine Translation of English Abstract).

*Primary Examiner* — Kevin M Bernatz
(74) *Attorney, Agent, or Firm* — McCoy Russell LLP

(57) ABSTRACT

A metal separator plate for an electrochemical system, having at least a first laser-surface-treated region with a first passivation layer and a second region with a native or reconstructed passivation layer, wherein, as a result of the laser surface treatment, the first passivation layer has: a charge carrier density that is increased by at least 10%, and a surface area that is no more than 5% larger in relation to the native or reconstructed passivation layer. The present disclosure further relates to methods for producing and characterizing such a separator plate.

4 Claims, 14 Drawing Sheets

(56) References Cited

U.S. PATENT DOCUMENTS

| | | | |
|---|---|---|---|
| 2021/0288336 A1 | 9/2021 | Gaugler et al. | |
| 2022/0085359 A1* | 3/2022 | Kubo | H01M 10/0525 |
| 2024/0154248 A1* | 5/2024 | Zhai | H01M 50/469 |

* cited by examiner

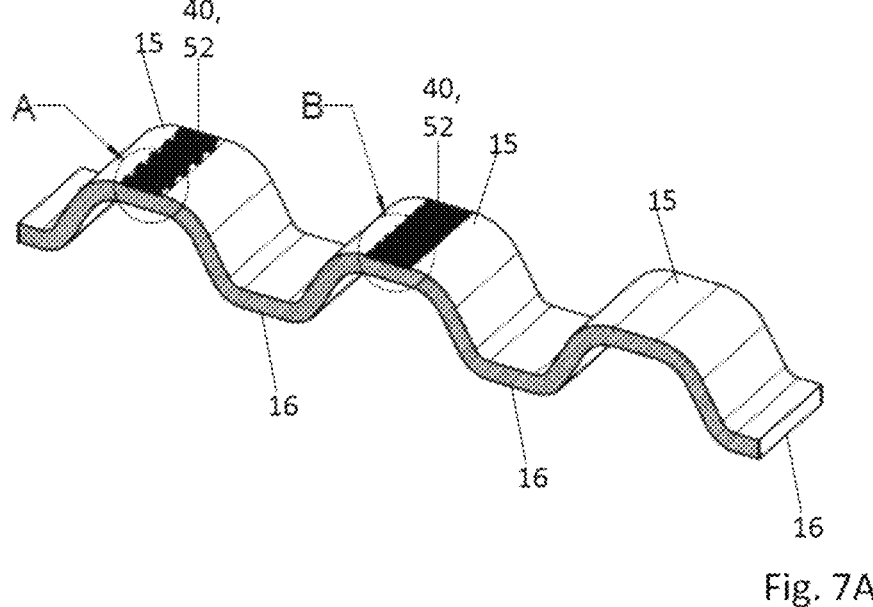
Fig. 7A
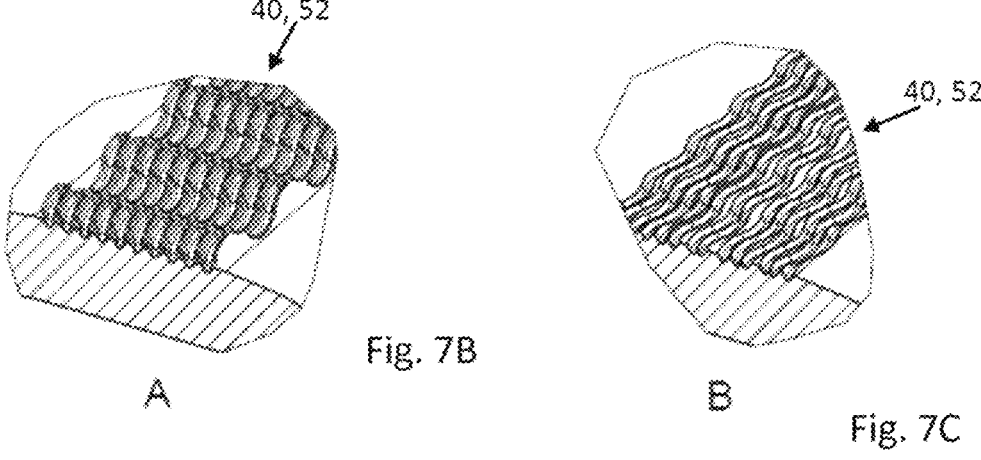
Fig. 7B
Fig. 7C 40, 52

40, 52

(enlarged)

5μm 40, 52

LASER-SURFACE-TREATED SEPARATOR PLATE, METHOD FOR PRODUCING SAME, AND METHODS FOR CHARACTERIZING SAME

CROSS-REFERENCE TO RELATED APPLICATION

The present application claims priority to German Patent Application No. 10 2021 209 997.1, entitled "LASER-SURFACE-TREATED SEPARATOR PLATE, METHOD FOR PRODUCING SAME, AND METHODS FOR CHARACTERIZING SAME", and filed on Sep. 9, 2021. The entire contents of the above-listed application is hereby incorporated by reference for all purposes.

TECHNICAL FIELD

The present disclosure relates to a laser-surface-treated separator plate for an electrochemical system, and to methods for producing and characterizing such a separator plate. The electrochemical system may be a fuel cell system, an electrochemical compressor, an electrolyser, or a redox flow battery.

BACKGROUND AND SUMMARY

Separator plates may have various functions in electrochemical systems. On the one hand, they may serve to ensure an electrically conductive connection to an adjacent layer, which may for example be a gas diffusion layer. On the other hand, separator plates typically serve to supply and/or discharge reactants and/or reaction products, with a channel structure usually being provided for this purpose. In addition, reaction heat can be conveyed away by means of the separator plates, for example by means of a coolant. For mobile applications, such as in motor vehicles, it may be desired to produce separator plates from metal because the greater mechanical stability of metal compared to other materials allows a more compact design of fuel cells and fuel cell stacks.

However, one problem arises from the fact that metals which are suitable from an economic standpoint, and which are sufficiently corrosion-resistant to withstand the aggressive conditions that usually prevail in fuel cells, have a tendency towards passivation. By way of example, stainless steel forms a passivation layer of chromium oxide, and only then does it become resistant to corrosion. However, a passivation layer leads to a significantly increased electrical contact resistance at a contact area, as a result of which the function of a separator plate to establish a low-loss electrical connection would be impaired to an unreasonable extent. In addition, the aforementioned aggressive reaction conditions have a negative effect on the service life of the separator plates.

There is therefore a constant need to improve separator plates with regard to their corrosion resistance, electrical contact resistance, production costs and/or service life.

It is therefore an object of the present disclosure to specify a separator plate that solves at least one of the aforementioned problems. A further object of the present disclosure is to specify a method by which such a separator plate can be produced or characterized.

This object and others are achieved by the separator plates according to embodiments as described herein. Methods for characterizing a separator plate are also presented. Advantageous embodiments of the present disclosure will become apparent through the description below.

According to a first aspect, a metal separator plate for an electrochemical system is provided. The separator plate has at least a first laser-surface-treated region with a first passivation layer and a second region with a native passivation layer, wherein, as a result of the laser surface treatment, the first passivation layer has a charge carrier density that is increased by at least 10% and a surface area that is no more than 5% larger in relation to the native passivation layer.

According to a second aspect, a metal separator plate for an electrochemical system is likewise provided. This separator plate likewise has at least a first laser-surface-treated region with a first passivation layer that has an increased charge carrier density as a result of the laser treatment of the surface. This laser surface treatment can be detected even if, for example, the entire surface of the separator plate has undergone a corresponding laser treatment of the surface. To do so, the first passivation layer is at least largely removed in one section and then reconstructed. The charge carrier density is determined both before the removal and after the reconstruction, such as by means of a Mott-Schottky analysis. The separator plate has a first passivation layer which, as a result of a laser surface treatment of the separator plate, has a charge carrier density that is increased by at least 10% and a surface area that is no more than 5% larger in relation to the reconstructed passivation layer.

The metal separator plate may thus have the first passivation layer over the entire surface or in one or more sections, the first passivation layer being detectable through comparison with a native passivation layer or with a reconstructed passivation layer.

The following embodiments and features of the separator plate may relate to the separator plate according to the first aspect and according to the second aspect, unless otherwise stated, or unless it is evident that only one separator plate according to one of the two aspects is meant.

The inventors have surprisingly discovered that the surface of the separator plate is structurally changed as a result of the laser surface treatment such that the charge carrier density in the passivation layer is increased by the laser surface treatment. The change in the surface includes a rearrangement and/or a partial removal and/or chemical modifications of the surface material. Here, the laser surface treatment takes place in such a way that the surface area of the laser-surface-treated region does not change significantly, namely by no more than 5%, in relation to the surface area of the native passivation layer or the reconstructed passivation layer. The laser surface treatment therefore does not increase the roughness of the surface, but rather is sometimes even associated with a smoothing of the surface. In order to compare the surface areas of the two passivation layers, the examined sample sections of the passivation layers may have the same base area. Here, the base area may be defined as a projection, such as an orthogonal projection, of the respective sample section onto a plate plane of the separator plate.

For example, the separator plate has a first passivation layer which, as a result of a laser surface treatment of the separator plate, has a charge carrier density that is increased by at least 25%, such as by at least 50%, and yet a surface area that is only at most 5% larger in relation to the native passivation layer or the reconstructed passivation layer.

A region of the separator plate that has not undergone any laser surface treatment comprises the native passivation layer mentioned above. The native passivation layer can be understood as a spontaneous passivation layer, which is created as a result of the bare metal of the separator plate, or of the metal sheet from which the separator plate is produced, reacting with oxygen and/or moisture from the ambient air. Usually, a native passivation layer that extends over the entire surface of the separator plate is already present on the metal before the separator plate is finally formed from the metal sheet. The laser surface treatment thus typically takes place on the native passivation layer, thereby modifying the electrochemical and physical properties of the native passivation layer.

Depending on the field of application, the first passivation layer extends over an entire surface of the separator plate or only in one or more regions thereof, i.e. in the first region. In some embodiments, the second region with the native passivation layer adjoins the first region with the first passivation layer. Alternatively, the first region and the second region may also be regions of the separator plate that are separate from one another.

If the entire separator plate has been subjected to the laser surface treatment, the first passivation layer may be removed at least in one region, e.g. electrochemically, and then reconstructed, e.g. by an acid. Like the native passivation layer, the reconstructed passivation layer then likewise has a lower charge carrier density than the first passivation layer. Overall, therefore, when a voltage is applied, a higher current density can be measured in the laser-surface-treated regions than outside of the laser-surface-treated regions. The current density may be measured, for example, by means of C-AFM (Conductive Atomic Field Microscopy).

Theoretically, it would also be conceivable that the first passivation layer of the separator plate is compared with a native passivation layer of another, untreated separator plate, for example from the same batch, in order to be able to ascertain that the separator plate has the first passivation layer. However, the measurement accuracy is often higher when regions of the same separator plate are compared with one another. For this reason, once the charge carrier density and the surface area have been measured, the first passivation layer is removed, and the reconstructed passivation layer is formed in this region. In principle, a native passivation layer could occur in this region, which can be compared with the first passivation layer with regard to its charge carrier density and surface area. However, the native passivation layer usually takes a relatively long time to build up naturally. It is therefore advantageous if an accelerated passivation of the metal takes place by means of an added reactant or oxidizing agent, such as an acid, in order to form the reconstructed passivation layer. Thereafter, the charge carrier density and the surface area are measured in the region of the reconstructed passivation layer.

The respective passivation layer (first, native, or reconstructed) typically contains metal oxide and/or metal hydroxide. It may be provided that the first passivation layer has a higher metal oxide or metal hydroxide content than the native passivation layer or the reconstructed passivation layer. The surface structure may therefore have an increased oxygen content or hydroxide content compared to the material prior to the laser irradiation and/or compared to material in non-surface-structured regions. This can be attributed, for example, to the energy input during the irradiation.

In general, the respective passivation layer can be understood as a semiconductor layer, which usually has a doping. The doping comprises foreign atoms or impurities in the semiconductor material and changes the properties of the semiconductor, i.e. the behaviour of the electrons and thus the electrical conductivity and/or the charge carrier density. Even a minimal foreign atom density or impurity density can significantly increase the charge carrier density and thus cause a very large change in the electrical conductivity. Sometimes, the first passivation layer has a greater density of lattice defects, N-type charge carriers and/or P-type charge carriers than the native passivation layer or the reconstructed passivation layer. According to normal convention, electron acceptors are present in the case of P-doping, while electron donors are present in the case of N-doping. Mixed forms may also occur, in which both P-type charge carriers and N-type charge carriers are present. For instance, stainless steel typically has a passivation layer that contains both types of charge carriers.

Despite a possibly higher oxygen content in the first passivation layer, the increased charge carrier density in the first passivation layer may lead to a reduction in the electrical contact resistance and/or to an increase in the electrical conductivity, for instance compared to the native passivation layer and the reconstructed passivation layer. The separator plate may thus have a greater electrical conductivity and/or a lower electrical resistance in the region of the first passivation layer than outside of the first passivation layer, i.e. in the native passivation layer or the reconstructed passivation layer.

The charge carrier density can be determined by taking into account a Mott-Schottky analysis or a Mott-Schottky plot. A Mott-Schottky analysis generally measures changes that occur at an electrochemical interface when an applied DC voltage is gradually changed. An electrochemical cell is excited using an AC voltage potential with a fixed frequency and small signals. The impedance of the interface between the working electrode and the electrode is measured as a function of the DC voltage. Using the Mott-Schottky equation $$\frac{1}{C2} = \left(\frac{2}{\varepsilon_0 \varepsilon_r e_0 N}\right)\left(E - \frac{kT}{e_0}\right)$$

a straight line can be obtained with the Mott-Schottky plot due to the linear relationship between C-2 and E. By analysing the slope m of the straight line $$m = \frac{2}{\varepsilon_0 \varepsilon_r e_0 \cdot N}$$

the charge carrier density N can then be determined. In the above equations (1) and (2), C is the capacitance, E is the potential, k is the Boltzmann constant, T is the temperature, $e_0$ is the elementary charge, $\varepsilon = \varepsilon_0 * \varepsilon_r$ is the dielectric constant, and N is the charge carrier density to be determined.

This manner of determination is known to a person skilled in the field of electrochemistry and is described, for example, in the publication Schmickler, Wolfgang, Santos, Elizabeth "Interfacial Electrochemistry", Springer, 2010.

In some embodiments, it may be provided that, to determine the increased charge carrier density of the first passivation layer, the charge carrier density of the first passivation layer is determined, such as by means of a Mott-Schottky analysis, the first passivation layer is at least largely removed at least in one section, a passivation layer is reconstructed in this section, and the charge carrier density of the reconstructed passivation layer is determined, such as by means of a Mott-Schottky analysis.

The metal separator plate usually comprises a main body, which is made of metal. For instance, the separator plate may be manufactured from a metal sheet. The metal used for the separator plate or the main body may be, for example, stainless steel.

The passivation layers (first, native, and/or reconstructed) mentioned in this specification usually have a thickness of <10 nm.

In the laser-surface-treated region, the separator plate may have periodic surface structures with a mean spatial period of less than 10 µm. Here, the periodic surface structures are created by the laser surface treatment. The first passivation layer may be at least part of the surface structures. The surface structures may also comprise a material layer located directly below the first passivation layer, said material layer comprising the metal of the separator plate. For example, the mean spatial period is at most 2 µm, such as at most 1.5 µm.

Usually, the surface structures are arranged periodically with respect to one another at least in one spatial direction. The surface structures may also be arranged periodically with respect to one another in two spatial directions. According to some embodiments, the surface structures at least in some sections are arranged in parallel next to one another and/or in parallel one behind the other. The alignment may exist over relatively large or relatively small regions. For example, the surface structures extend parallel to one another at least within a region enclosed by a grain boundary. Different regions containing parallel surface structures, but in which there is a different orientation compared to another region, may also adjoin one another, for example at grain boundaries.

The shape of the structures on the surface thus repeats in at least one spatial direction. The spatial period typically denotes the maximum spacing between two adjacent surface structures of identical or similar shape. For reasons linked to production, the surface structures are usually not completely identical to one another. Rather, the period may be subject to fluctuations along the surface. A mean spatial period is therefore specified, which is less than 10 µm. It may also happen that the spatial period of the surface structures is less than 10 µm in any case. The spatial period of the surface structures may be directly dependent on the wavelength of the laser light used and usually lies in the order of magnitude of the wavelength of the laser light used.

Such periodic surface structures are typically created by means of laser radiation from an ultrashort-pulse laser (see below) and are also known in the literature as "Laser-Induced Periodic Surface Structures" (LIPSS). For further explanations, details and definitions regarding LIPSS, reference is made to the following publication: "*Dynamik der Erzeugung und Mechanismen der Entstehung von periodischen Oberflächenstrukturen im Nanometerbereich (LIPSS) durch die Bestrahlung von Festkörpern mit Femtosekunden-Laserpulsen*" [*"Dynamics of creation and mechanisms of formation of periodic surface structures in the nanometre range (LIPSS) by irradiation of solids with femtosecond laser pulses"*], dissertation by Sandra Höhm, Berlin, 2014 (hereinafter: Höhm 2014), which is fully incorporated as part of this disclosure by way of reference.

The inventors have found that the aforementioned surface structures may be suitable for use in separator plates of an electrochemical system. Specifically, by virtue of the periodic surface structures, surface properties of the separator plate can be modified in a targeted manner. By way of example, chemical and/or electrical properties of the surface can be influenced and/or improved by virtue of the surface structures. For instance, the periodic surface structures ensure the above-mentioned increased charge carrier density of at least 10%.

It has been found, for example through AFM measurements or SEM measurements, that the creation of the periodic surface structures leads to a smoothing of the raw material of the separator plate. A surface that has the periodic surface structures therefore has a surface area that is no more than 5% larger than, or a surface area that is substantially equal to, or even a surface area that is smaller than a region of equal base area that does not have the periodic surface structures or that has not undergone any laser surface treatment within the meaning of this specification.

The surface structures may extend, for example, in a wavy or linear manner along their longitudinal direction. In one embodiment, the surface structures may comprise depressions and/or elevations. The depressions may extend between the elevations and are usually delimited and/or formed by the latter. At least in some sections, the depressions and/or elevations may extend substantially parallel to one another (for example in parallel next to one another or one behind the other). The surface structures often form, at least locally, a trench structure comprising a plurality of elongated depressions which are oriented substantially parallel to one another. The number of surface structures, depressions and/or elevations can be varied according to requirements. For instance, the number of depressions may depend on the size of the surface that is to have the surface structures. In a region containing similar or identical surface structures, there are typically at least 10 or at least 20 trench structures, for example depressions, which extend parallel to one another at least in some sections. It is also possible to provide a different number of periods over a certain length in different regions in at least one spatial direction on the surface. If the surface structures are provided in the region of the channel structures of the separator plates, a different number of periods over a certain distance in one spatial direction may for example be provided in the elevated regions of the channel structures, for example the webs or sections of the channel side walls, than in the recessed regions of the channel structures, such as the channel bottoms and sections of the channel side walls.

The dimensions of the depressions, such as the period, usually depend at least on the wavelength of the laser radiation used. By way of example, the depressions have a depth of at least 8 nm, at least 20 nm, for example at least 50 nm and/or at most 3 µm, at most 1 µm, such as at most 500 nm, at most 300 nm, usually at most 250 nm. The depth is usually measured normal to the surface formed by the elevations or normal to the surface of the separator plate that is free of the periodic surface structures. Furthermore, the depressions may have a width of at least 0.1 µm and/or at most 2 µm. The width is typically measured at half height and perpendicular to the local longitudinal direction of the depressions. In addition, the depressions may have a period in one spatial direction of at least 100 nm, usually at least 0.3 µm and/or at most 3 µm, at most 1.5 µm, such as at most 1.2 µm, such as at most 1000 nm, typically at most 700 nm. The periodic surface structures thus often comprise nanostructures having a depth, width and/or period of in each case less than one micrometer or, with regard to the period, slightly more than one micrometre.

The separator plate may additionally have a coating, which may differ from the material of the main body of the separator plate. The coating may for example be provided in one or more regions or over the entire surface. In the case of starting materials that are coated over the entire surface, it is possible to remove the coating in one or more sections in order to subject at least areas of the exposed metal surface to a laser surface treatment. Likewise, a non-laser-surface-treated region may be provided with a coating at least in some sections or entirely, for example for forming a sealing element or for microsealing a sealing element. The coating may contain one or more of the following substances or may comprise one or more of these substances or alloys thereof: polymers, electrically conductive oxides, carbon, such as electrically conductive carbon layers, precious metals such as Au, Ag or Pt, metals such as Ti or Cr, metal nitrides, such as TiN, CrN, Cr2N, metal carbides, metal borides, metal silicides, and/or silicon carbide. The electrical conductivity is not only calculated based on the separator plates, but is typically compared on the basis of a comprehensive system comprising two interconnected separator plates and gas diffusion layers or gas diffusion media arranged on both sides of this assembly. For testing purposes, it is also possible for just one sheet-metal layer, such as that used for a separator plate, to be measured in combination with gas diffusion media, which are usually applied to both sides.

The separator plate usually has two opposite flat sides. In certain embodiments, the laser surface treatment, i.e. the first passivation layer, may be provided on just one of the flat sides or on both flat sides. In one embodiment, at least one of the flat sides is laser-surface-treated over the entire surface. In other embodiments, only one region or several regions of the separator plate have the laser surface treatment or the first passivation layer. There may thus be at least one region that is free of the laser surface treatment. The two flat sides of the separator plate may comprise a reactant side or gas side and a coolant side. The first passivation layer may be arranged on the reactant side or gas side of the separator plate. In addition or as an alternative, the first passivation layer may be arranged on the coolant side of the separator plate.

The separator plate usually comprises a flow field for guiding a reaction medium along a flat side of the separator plate. In one embodiment, the first passivation layer is provided in the region of the flow field. According to one example, the first passivation layer is provided only in the region of the flow field, such as only in an electrochemically active region of the flow field. In one embodiment, the separator plate has a plurality of webs, as well as channels formed between the webs. The webs and the channels may form the flow field for guiding the reaction medium along one of the flat sides of the separator plate. The webs typically form a contact area, such as for bearing against a diffusion layer. For instance, at least the webs have the first passivation layer. The first passivation layer may also be present outside the webs, for example in the region of the channels. Alternatively, only the webs have the first passivation layer, for instance in the region of the aforementioned contact area. It has been found that an electrical resistance in the region of the contact area can be reduced as a result of the first passivation layer. In other words, the electrical resistance in the region of the contact area between the webs and the diffusion layer may be greater if no first passivation layer is formed on the webs.

On the opposite surface of the separator plate, too, webs may be formed on the rear side of channels, these webs being referred to hereinafter as rear-side webs. In the assembled state, these come to bear against comparable rear-side webs of another separator plate. Here, too, it has been found that the electrical resistance of the contact area can be reduced as a result of the laser surface treatment.

In one embodiment, the partial laser surface treatment, in the form of a treatment of only the webs and/or rear-side webs, may extend substantially over the entire surface of the respective web or rear-side web. However, it is also possible to provide only sections of a web or rear-side web with the first passivation layer by means of a laser.

A bipolar plate for an electrochemical system can also be provided by the present disclosure, the bipolar plate comprising two of the above-described separator plates which are joined together and may be connected in a sealed manner with respect to the surrounding environment, for example welded in a sealed manner. The webs of the two separator plates each form a contact area for bearing against the gas diffusion layer. Rear-side webs are formed on the rear sides of the channels, i.e. on the inward-facing surfaces of the separator plates, the two separator plates typically bearing against each other in the region of these rear-side webs. If treated by means of a laser, the contact areas, both between a web and a gas diffusion layer and between adjoining rear-side webs, may have a lower electrical resistance in the region of the first passivation layer.

The bipolar plate may be designed to guide a coolant. To this end, at least one separator plate may have a plurality of cooling channels, such as on an opposite flat side of the separator plate than the flow field for a reaction medium, i.e. in the interior of the bipolar plate. Not only are the two separator plates usually connected to one another in a fluid-tight manner along and at a distance from their outer edge, but generally they may also have materially bonded connections to improve the electrical conductivity, such as welded joints, in the electrochemically active region of the flow field, more specifically in the contact zones thereof that are formed by the rear-side webs. It has been found that the resistance can also be reduced at this interface by means of the first passivation layer or the laser surface treatment. For example, the first passivation layer is also present on the coolant side of a separator plate, either in one or more sections or over the entire surface, such as in the region of the contact areas between the separator plates, for instance on the aforementioned rear-side webs. The first passivation layer may therefore be present on one or both surfaces of the separator plate, i.e. on the coolant side and/or on the reactant side.

As mentioned above, the first passivation layer may lead to a significant reduction in the electrical contact resistance and/or to a significant increase in the electrical conductivity. As a result of this improvement in the electrical conductivity, it has been found that the materially bonded connections, such as the aforementioned welded joints in the contact zones, can even be omitted. In one embodiment, therefore, the bipolar plate may be free of materially bonded connections, such as welded joints, within the flow field or within the electrochemically active region on the coolant side and in said contact zones of the two separator plates where the surface structures are arranged. Here, the contact zones are usually formed by the rear-side webs of the separator plates. It is also possible merely to reduce the number or density of the connection points, for example welded joints, compared to conventional bipolar plates, for example to an extent that still ensures sufficient mechanical stability. For instance, the surfaces of the coolant side may also be free of coatings in order to increase the conductivity.

An electrochemical system comprising a plurality of such separator plates or bipolar plates can also be proposed by the present disclosure. The electrochemical system may be a fuel cell system, an electrochemical compressor, an electrolyser, or a redox flow battery.

Known electrochemical systems of said type normally comprise a stack of electrochemical cells, which are each separated from one another by bipolar plates. Such bipolar plates may serve for example to electrically contact the electrodes of the individual electrochemical cells (for example fuel cells) and/or to electrically connect adjacent cells (connecting the cells in series). Typically, the bipolar plates are formed of two joined individual plates, which are also referred to as separator plates within the scope of the present document. The single plates may be joined together in a materially bonded manner, for example by one or more welded joints, for instance by one or more laser-welded joints.

The bipolar plates or the separator plates may each have or form structures, which are configured for example to supply one or more media to the electrochemical cells arranged between adjacent bipolar plates and/or to remove reaction products. The media may be fuels (for example hydrogen or methanol), reaction gases (for example air or oxygen) or coolants. Furthermore, the bipolar plates may be designed to dissipate the waste heat that is generated when converting electrical and/or chemical energy in the electrochemical cell, and to seal off the various media channels and/or cooling channels from one another and/or from outside.

Furthermore, the bipolar plates usually each have at least one through-opening, through which the media and/or the reaction products can be routed towards the electrochemical cells arranged between adjacent bipolar plates of the stack or conveyed away therefrom. The electrochemical cells typically each also comprise one or more membrane electrode assemblies (MEAs). In addition, gas diffusion layers may be provided, which are usually arranged in each case between the MEA and the bipolar plate and are formed, for example, as a metal or carbon fleece.

According to a third aspect, a method for producing a separator plate for an electrochemical system is also provided by the present specification. The method comprises the steps:

provided a metal separator plate, irradiating at least a first region of the separator plate by means of a pulsed laser, a pulse duration of the laser pulses being less than 100 ps, for example less than 50 ps, forming a first passivation layer in the first region of the separator 5 plate, wherein the first passivation layer has a charge carrier density that is increased by at least 10% and a surface area of the two regions that is no more than 5% larger in relation to the native passivation layer.

A passivation layer that is already present on the separator plate, for instance a native passivation layer, is usually modified by the laser radiation, thereby creating the first passivation layer. The first passivation layer then has, as a result of the laser radiation, the modified properties in relation to the native passivation layer. As a result of the laser radiation, the first passivation layer also has modified properties in comparison to a surface that is subsequently removed and then reconstructed, but not irradiated again by means of a laser.

The laser pulses may have a pulse duration of less than 100 ps, such as less than 50 ps or, for example, less than 20 ps. For instance, the laser pulses have a pulse rate of less than 1 MHz or less than 800 kHz. Here, the pulse rate may be greater than 1 kHz, for instance greater than 10 kHz. For instance, it is advantageous if the ratio of pulse rate to pulse duration is at least 1000. Due to this short pulse duration and the comparatively low pulse rate, on the one hand very high intensities can be achieved, which is required for the laser treatment of the surface and/or rearrangement of the surface material and/or changing the chemical composition of the surface material. On the other hand, the short pulse duration in conjunction with the considerable dead times enables the surface material to be machined in a manner largely free of heat diffusion, and thus makes it possible to create the first passivation layer.

In certain embodiments, the pulse duration is less than 50 ps, less than 20 ps, less than 10 ps, or even less than 1 ps. In some embodiments, pulse durations in the fs range are used, for example greater than 30 fs and/or less than 1000 fs and/or less than 500 fs, or for example greater than 50 fs and/or greater than 100 fs. For instance, picosecond or femtosecond lasers can be used for the method, these being referred to collectively as ultrashort-pulse lasers. In contrast, nanosecond pulses with a pulse duration greater than 1 ns have proven to be unsuitable for producing the above-described separator plate.

Typically, a fluence of the laser radiation lies in the order of magnitude of the ablation threshold of the material used for the separator plate. The fluence of the laser light may be at least so great that an ablation or rearrangement of the material is possible. For example, the fluence may be selected in such a way that it deviates by no more than 20% from the ablation threshold of the material used for the separator plate. The fluence is a measure of the energy density of the laser pulses and is usually specified in $J/cm^2$. The fluence may be, for example, at least 0.001, at least 0.01 or at least 0.1 and/or at most 10.0, at most 5.0 or at most 2 $J/cm^2$. The repetition rate of the laser may be, for example, at least 100 kHz, at least 1 kHz, for example at least 10 kHz, and/or at most 1000 kHz, such as at most 800 kHz. The low repetition rate results in considerable dead times, so that the total energy input is limited and only the surface layer is modified.

In summary, due to the short energy deposition in a time range below the thermal relaxation time, a modification of the material of the separator plate can be achieved practically without any mechanical or thermal damage to the workpiece ("cold" ablation). Very small structures (sub-μm to 100 μm) can thus be created, which are defined substantially only by the optical properties of the laser beam.

The method for producing the separator plate may additionally comprise the following step:

creating periodic surface structures on the separator plate by means of the laser radiation.

The first passivation layer is usually part of the periodic surface structures. Here, the periodic surface structures are typically created within a spatially contiguous projection of the respective laser pulse onto the separator plate. A plurality of periodic surface structures can be created per laser pulse. The creation of each periodic surface structure by the respective laser pulse can be completed before the next laser pulse hits. At least 5 or at least 10 or at least 20 periodic surface structures, such as trench structures, can be created per laser pulse. The periodic surface structures are thus created by each laser pulse within the contiguous surface irradiated by the respective laser pulse and not, for example, as a result of the separator plate being scanned in a spatially periodic manner or being irradiated with a spatially periodic, non-contiguous light pattern such as a diffraction pattern or interference pattern.

The surface structures usually take the form of a periodic trench structure, the shape of which depends on the process parameters. Possible process parameters are disclosed, for example, in Höhm 2014. Whether so-called LIPSS are created here depends on a number of process parameters and on the interaction therebetween; mention must be made primarily of pulse energy, frequency and defocusing of the laser beam.

For instance, the periodic surface structures may be created as a result of the incident laser radiation interacting with the irradiated surface. The interaction leads to a spatially modulated coupling of energy into the material, which leads to the periodic surface structures. In this case, the periodic surface structures are typically created through optical interference of the incident laser radiation by an electromagnetic surface wave generated by the laser pulse in the material of the separator plate.

According to one embodiment, the laser radiation is linearly polarized. The surface structures are typically oriented perpendicular to a polarization direction of the incident laser radiation. This may apply to core regions of the irradiated area and for example to regions which extend within the grain boundaries of the untreated sheet. In regions which adjoin one another, but which are separated from one another by a grain boundary, the surface structures may in contrast be oriented differently. A mean spatial period of the surface structures may be at least 2%, at least 5%, at least 20% and/or at most 200%, for example at most 120% of the laser wavelength used. The separator plate may thus have different regions which each contain periodic structuring, but with a different orientation in the different regions. In this case, said regions may adjoin one another.

The most common LIPSS are referred to in the literature as "Low Spatial Frequency LIPSS" (LSFL) (see Höhm 2014). LSFLs have an orientation perpendicular to the polarization of the laser beam and a period in the region of the wavelength of the laser used. By virtue of the angle of incidence relative to the surface, it is possible both for the period to be varied as a result of the projection and for the orientation of the LSFL to be rotated through an angle of up to 90°. It has been reported in the literature that the period P of LSFLs lies in the order of magnitude of the wavelength $\lambda$ of the incident laser radiation (cf. Höhm 2014), i.e. for example $P \approx \lambda$. A second type of LIPSS, the so called HSFLs ("High Spatial Frequency LIPSS"), have significantly smaller periods PHSFL compared to the laser wavelength (PHSFL«k). Their orientation is coupled to the polarization of the radiation in a material-dependent manner and is usually oriented either parallel or perpendicular thereto.

According to one variant, the surface structures are created by means of a single laser beam. The surface of the separator plate can be successively scanned by the laser beam. The laser beam or laser pulse hitting the separator plate may have a beam diameter or a smallest lateral dimension of at least 20 µm, for example at least 40 µm. In other words, the contiguous projection of the laser beam onto the separator plate, which can also be referred to as a laser spot, laser dot or laser point, may have the aforementioned beam diameter or the aforementioned smallest lateral dimension of at least 20 µm, for example at least 40 µm. When using a line laser or linear laser, the laser line may have a width (smallest lateral dimension) of at least 20 µm, such as at least 40 µm.

In another embodiment, at least two laser beams, such as at least two linearly polarized laser beams, are superimposed. By superimposing the laser beams, an interference pattern can be formed. A diffraction pattern can also be used.

By using the interference pattern or diffraction pattern, the surface of the separator plate can be scanned more quickly than when using just one laser beam. Overall, therefore, the method can be carried out much more quickly. For this purpose, the laser beam of a laser may be divided into two sub-beams. The interference pattern or diffraction pattern usually comprises a plurality of spatially non-contiguous light spots. It should be noted here that the spatial period of the periodic surface structures is established not by the spatial period of the interference or diffraction pattern of the laser radiation, but rather by the interaction of the short laser pulse with the separator plate, see also above. The spatial period of the surface structures therefore deviates from the spatial period of the interference pattern or diffraction pattern of the laser radiation and is usually much smaller, for example 10 times smaller.

The method for producing the separator plate may comprise the following additional step: removing sections of a coating present on the surface of a metal layer by means of an additional laser treatment, such as in the case of a metal layer that is coated over the entire surface. Removal by means of the same laser is possible; alternatively, a different laser can be used to remove the coating. The laser surface treatment for structuring the surface then may take place only in the region of the metal layer that has been freed of the coating, but need not extend over the entire region that has been freed from the coating.

It should be noted that, according to the aforementioned production method, the steps of forming the flow field and irradiating the separator plate by means of the pulsed laser can be swapped. It may therefore be provided that the laser surface treatment of the separator plate takes place before or after the sheet is shaped in order to form the flow field. The flow field is typically formed by deep-drawing, hydroforming or embossing the separator plate.

The method may be used to produce one of the separator plates described above. Features mentioned only in relation to the separator plate or the bipolar plate or the electrochemical system can also be applied for the method, and vice versa.

In addition, according to a fourth aspect, a method for characterizing a separator plate of an electrochemical system is presented. The method comprises the steps:
   providing a metal separator plate, which has a first laser-surface treated region with a first passivation layer and a second region with a native passivation layer,
   determining a first charge carrier density of the first passivation layer,
   determining a second charge carrier density of the native passivation layer,
   comparing the first charge carrier density with the second charge carrier density.

In addition, according to a fifth aspect, a method for characterizing a separator plate of an electrochemical system is provided. The method comprises the steps:
   providing a metal separator plate, which has a first laser-surface-treated region with a first passivation layer,
   determining a first charge carrier density of the first passivation layer,
   at least largely removing the first passivation layer in one section,
   reconstructing a passivation layer in this section,
   determining a second charge carrier density of the reconstructed passivation layer, and
   comparing the first charge carrier density with the second charge carrier density.

The following embodiments and features of the methods may relate to the method according to the third aspect, the fourth aspect and the fifth aspect, unless otherwise stated, or unless it is evident that one of these methods is meant.

It may be provided that the removal of the first passivation layer takes place electrochemically. In some embodiments, the reconstruction of the passivation layer takes place in an acidic solution, such as a sulfuric acid solution for example. Reconstruction of the passivation layer in an alkaline solution is also possible.

The charge carrier densities may be determined, for example, by means of the Mott-Schottky analysis described above.

An example of how the first passivation layer and the reconstructed passivation layer can be compared with regard to their charge carrier densities will be described below.

The first passivation layer can be characterized with reference to its charge carrier densities (N-type and P-type) by means of a first Mott-Schottky analysis. With a potential applied, the first passivation layer is then electrochemically broken down at least in one region of the separator plate, e.g. in a corrosion cell. The first passivation layer may be completely broken down in said region. A new passivation layer then forms, e.g. in an acidic solution, and this can be understood as a reconstructed passivation layer within the meaning of this specification. The reconstructed passivation layer can then be characterized with reference to its charge carrier densities (N-type or P-type) by means of a second Mott-Schottky analysis. In one embodiment, the two Mott-Schottky analyses and the removal of the first passivation layer take place in the same electrochemical cell.

A surface area of the first passivation layer is usually compared with a surface area of the native passivation layer or of the reconstructed passivation layer. As indicated above, the sample sections to be compared have an equal base area. A morphology of the surface of a sample can be determined, such as by means of AFM measurements. The respective surface area can therefore be determined or estimated by means of AFM measurements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Exemplary embodiments of the separator plate, of the bipolar plate and of the electrochemical system are shown in the figures and will be explained in greater detail on the basis of the following description. In the figures:

FIG. 7A schematically shows one section of a separator plate in a perspective view;

FIG. 7B shows detail A from FIG. 7A;

FIG. 7C shows detail B from FIG. 7A;

Here and below, features that recur in different figures are denoted by the same or similar reference signs in each case.

DETAILED DESCRIPTION

Figure 1:
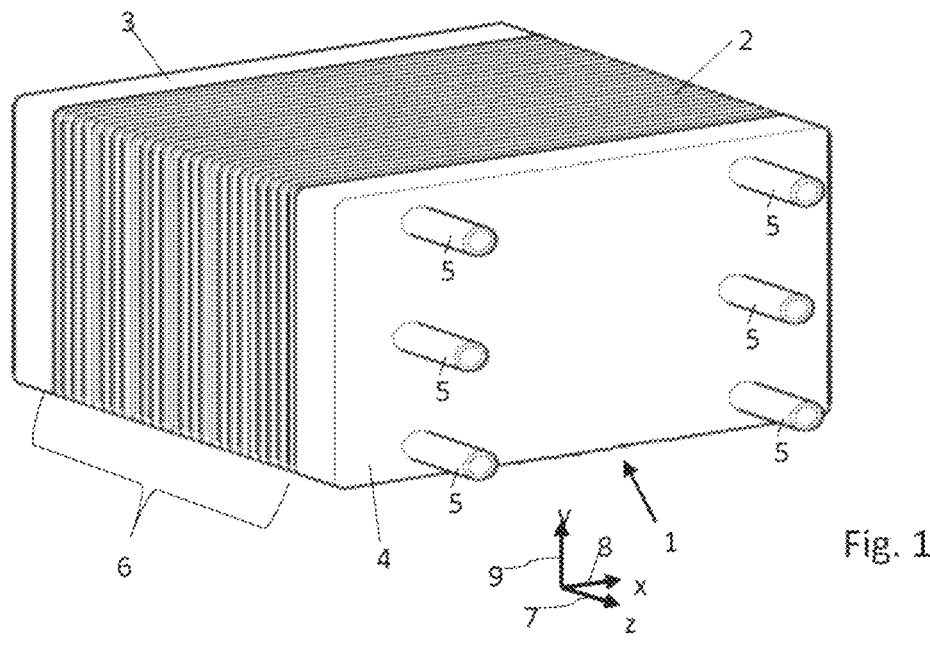
FIG. 1 schematically shows a perspective view of an electrochemical system comprising a plurality of bipolar plates.

FIG. 1 shows an electrochemical system 1 of the type proposed here, comprising a plurality of structurally identical metal bipolar plates 2 which are arranged in a stack and are stacked along a z-direction 7. The bipolar plates 2 of the stack are clamped between two end plates 3, 4. The z-direction 7 will also be called the stacking direction. The bipolar plates 2 usually each comprise two metal separator plates 2a, 2b which are connected to one another (see for example FIGS. 2 and 3). In the present example, the system 1 is a fuel cell stack. Each two adjacent bipolar plates 2 of the stack therefore enclose an electrochemical cell therebetween, which serves for example to convert chemical energy into electrical energy. The electrochemical cells usually each have a membrane electrode assembly (MEA) 10 (see for example FIGS. 2 and 3). The MEA typically contains in each case at least one membrane, for example an electrolyte membrane. Furthermore, a gas diffusion layer (GDL) may be arranged on one or both surfaces of the MEA.

In alternative embodiments, the system 1 may also be configured as an electrolyser, electrochemical compressor or as a redox flow battery. Bipolar plates can also be used in these electrochemical systems. The structure of these bipolar plates may then correspond to the structure of the bipolar plates 2 explained in detail here, even though the media guided on or through the bipolar plates in the case of an electrolyser, in the case of an electrochemical compressor or in the case of a redox flow battery may differ from the media used for a fuel cell system. The same applies to the separator plates.

The z-axis 7, together with an x-axis 8 and a y-axis 9, spans a right-handed Cartesian coordinate system. The bipolar plates 2 and separator plates 2a, 2b each define a plate plane, wherein the plate planes of the separator plates 2a, 2b are each oriented parallel to the x-y plane and thus perpendicular to the stacking direction or to the z-axis 7. The end plate 4 has a plurality of media ports 5, via which media can be supplied to the system 1 and via which media can be discharged from the system 1. These media that can be supplied to the system 1 and discharged from the system 1 may comprise for example fuels such as molecular hydrogen or methanol, reaction gases such as air or oxygen, reaction products such as water vapour or depleted fuels, or coolants such as water and/or glycol.

Figure 2:
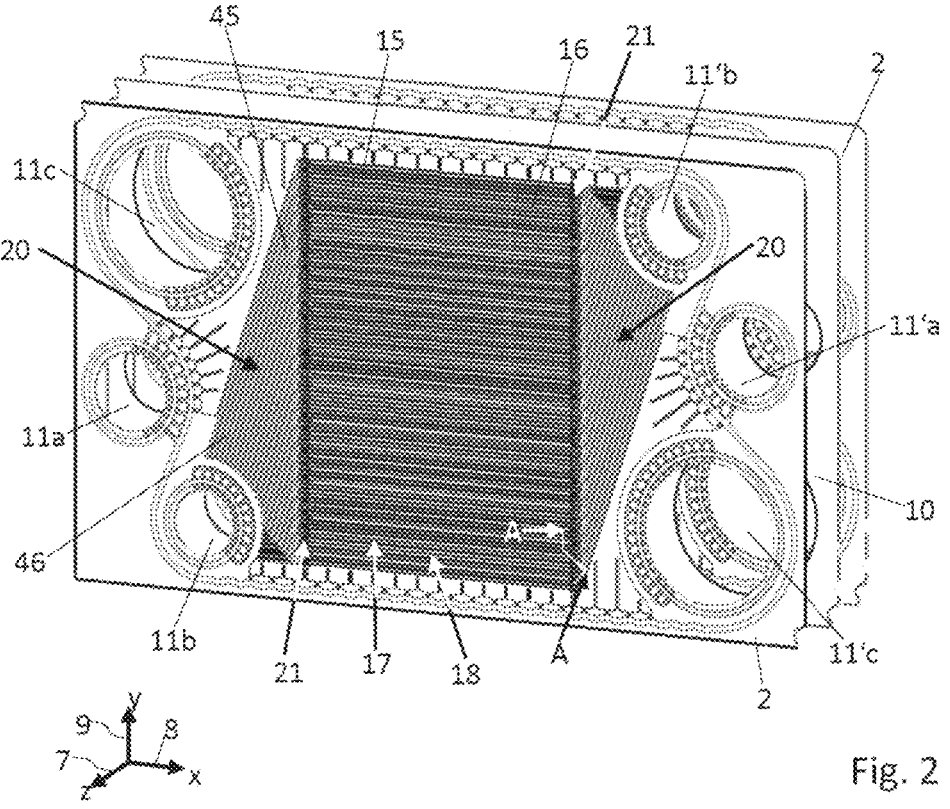
FIG. 2 schematically shows, in a perspective view, two bipolar plates for an electrochemical system of the type shown in FIG. 1, and a membrane electrode assembly arranged between the bipolar plates.

FIG. 2 shows, in a perspective view, two bipolar plates 2, as can be used for example in electrochemical systems of the type shown in FIG. 1. FIG. 2 also shows a membrane electrode assembly (MEA) 10 arranged between said adjacent bipolar plates 2, the MEA 10 in FIG. 2 being largely obscured by the bipolar plate 2 facing towards the viewer. The bipolar plate 2 is formed of two single plates, namely separator plates 2a, 2b, which are joined together in a materially bonded manner (see for example FIG. 3), of which in each case only the first single plate, which faces towards the viewer and obscures the second single plate, is visible in FIG. 2. The single plates may each be formed of a shaped metal sheet, for example of a stamped or deep-drawn stainless-steel sheet. This metal sheet may have for example a thickness of at most 150 μm, at most 100 μm, at most 90 μm, for instance at most 80 μm. The single plates may be welded to one another, for example by laser-welded joints.

The single plates usually have through-openings, which are aligned with one another and form through-openings 11a-c of the bipolar plate 2. When a plurality of bipolar plates 2 are stacked, the through-openings 11a-c, 11'a-c form media channels, which extend in the stacking direction 7 through the stack of the system 1 (see FIG. 1). Typically, each of the media channels formed by the through-openings 11a-c, 11'a-c is fluidically connected to one of the ports 5 in the end plate 4 of the system 1. For example, coolant can be introduced into the stack via the media channels formed by the through-openings 11a and can be discharged from the stack via the through-openings 11'a. In contrast, the lines formed by the through-openings 11b, 11c may be designed to supply fuel and reaction gas to the electrochemical cells of the fuel cell stack of the system 1, while the lines formed by the through-openings 11'b, 11'c may be designed to discharge the reaction products from the stack.

The first separator plates have, on the front side thereof facing towards the viewer of FIG. 2, a flow field 17 with structures for guiding a reaction medium along the front side of the separator plate. The electrochemically active region 18 forms part of this flow field 17. In FIG. 2, these structures of the electrochemically active region 18 are defined by a plurality of webs 15 and by channels 16 extending between the webs 15 and delimited by the webs 15. On the rear sides of the channels, i.e. on the opposite surface of the separator plate, rear-side webs 19 are formed, in the region of which the separator plates 2a, 2b bear against each other. On the front side of the bipolar plates 2, facing towards the viewer of FIG. 2, the first separator plates 2a additionally each have a distribution and collection region 20 for reaction medium, with a distribution and collection region for coolant (not visible) being located opposite this on the rear side of the separator plate 2a, i.e. on the inner side of the bipolar plate 2. The distribution region 20 comprises structures which are designed to distribute over the active region 18 a medium that is introduced into the distribution region 20 from a first 11b of the through-openings 11a, 11b, 11c, while the collection region 20 comprises structures which are designed to collect or to pool a medium flowing towards a first 11'b of the through-openings 11'a, 11'b, 11'c from the active region 18. To this end, the distribution and collection regions 20 have guide structures, which in FIG. 2 are defined by webs 35 and channels 36 formed between the webs 35. The channels 16 may each be fluidically connected to one of the through-openings 11b, 11'b via the channels 36. The electrochemically active region 18 is thus fluidically connected to the through-openings 11b, 11'b via the distribution and collection regions 20.

The structures of the active region 18 and the guide structures of the distribution region 20 and of the collection region 20 are in each case formed in one piece with the separator plates 2a, 2b and are integrally formed in the separator plates 2a, 2b, for example in an embossing, hydroforming or deep-drawing process. The same usually applies to the corresponding guide structures of the second separator plates 2b. The guide structures of the flow field 17 may comprise a plurality of webs 15 and optionally channels 16 formed between the webs 15 in the electrochemically active region 18, as well as a plurality of webs 35 and optionally channels 36 formed between the webs 35 in the distribution and collection region 20.

Figure 3:
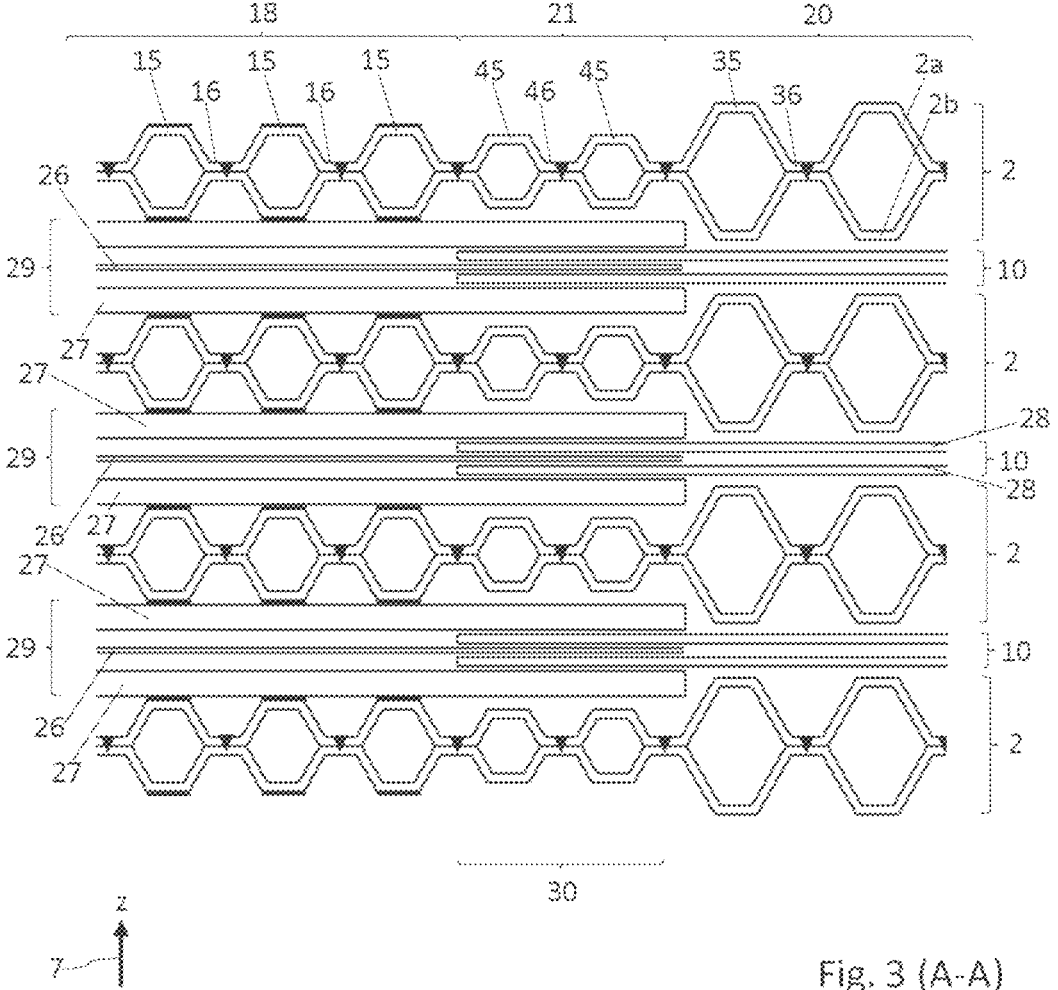
FIG. 3 shows a sectional view through an electrochemical system along a section line A-A shown in FIG. 2.

Also shown in FIG. 2 are two rectangular edge regions 21 of the flow field 17, which are arranged at the ends of the electrochemically active region 18 facing towards the distribution and collection region 20 and extend in the longitudinal direction across the entire width of the flow field 17, here transversely to the course of the channels 16 of the flow field 17. In the stack of the system 1, said edge regions 21 each serve to accommodate and bear an enhanced range of membrane electrode assemblies (MEAs) 10. The edge region 21 will hereinafter be referred to as the transition region 21. As can be seen in FIG. 3, the transition region 21 is lowered in comparison to the active region 18 (flow field 17) and in comparison to the distribution or collection region 20, which results in an optimal compression of the separator plate 2a, 2b or bipolar plate 2 and also of the MEA 10 in the stack. More details are published in WO 2018/114819 A1, which is incorporated as part of this disclosure by way of reference.

FIG. 3 shows a sectional view of a portion of the stack of the electrochemical system 1 of FIG. 1. The stack comprises a plurality of structurally identical bi20 polar plates 2 of the same type as the bipolar plate 2 shown in FIG. 2. The sectional plane is oriented perpendicular to the flat surface planes of the bipolar plates 2 or the separator plates 2a, 2b and follows the line A-A highlighted in FIG. 2. The active regions 18, the transition regions 21 and the distribution or collection regions 20 of the separator plates 2a, 2b or bipolar plates 2 are highlighted.

A membrane assembly 29 is arranged in each case between two adjacent bipolar plates 2 of the stack, each membrane composite having a membrane electrode 26 comprising an ionomer and at least one catalyst layer, gas diffusion layers 27 arranged on both sides of the membrane electrode 26, and reinforcing layers 28 arranged in some sections on both sides of the membrane electrode 26. The membrane electrode 26 and the reinforcing layers 28 together form the membrane electrode assembly (MEA) 10. Purely for the sake of clarity, FIG. 3 shows the stack in a state in which the bipolar plates 2 and the membrane assemblies 29 are not fully compressed along the z-direction 7, that is to say perpendicular to the flat surface planes of the bipolar plates 2 or the separator plates 2a, 2b.

In an embodiment of the region of the flow field 17, that is to say in the electrochemically active region 18 of the bipolar plates 2, the membrane assemblies 29 each comprise only the membrane electrode 26 and the gas diffusion layers 27 arranged on both sides of the membrane electrode. The membrane electrode 26 has a catalyst coating on both sides. In the region of the distribution or collection region 20, the membrane assemblies 29 comprise in each case of the embodiment only the two reinforcing layers 28, which are usually connected to each other. Only in the region corresponding to the transition region 21 of the separator plates 2a, 2b do the membrane assemblies 29 have a reinforced region 30, which in each case comprises the membrane electrode 26, the reinforcing layers 28 arranged on both sides of the membrane electrode 26, and the gas diffusion layers 27 arranged on both sides of the membrane electrode 26 and on both sides of the reinforcing layers 28. The reinforced region 30 of the membrane assembly 29 typically forms an edge of the electrochemically active region of the membrane assembly 29. Also in the transition region 21, the separator plates have webs 45 with channels 46 formed between the webs 45.

The separator plates 2a, 2b usually contact one another in contact regions, which are formed by the rear sides of the depressions 16, 36, 46, and bear flat against one another there. The separator plates 2a, 2b are usually connected there by means of materially bonded connections, such as laser-welded joints 24 which may improve the electrical conductivity and/or reduce the volume resistance in the active region 18 and optionally also in the transition region 21. In the distribution region 20, on the other hand, laser-welded joints may be used to avoid local swelling of the channels, that is to say to clearly define the volumes available for the fluid flow. The laser-welded joints 24 are therefore provided for example in the flow field 17, such as in the electrochemically active region 18, in the transition region 21 and in the distribution region 20, for instance in the contact zones or contact regions thereof. The welded joints 24 may, for example, form welds which are continuous in the x-direction (i.e. parallel to the flow direction of the cooling fluid), or alternatively may form stitch welds which in each case comprise linear weld sections arranged in a row and may be spaced apart from one another.

Embodiments of the present disclosure will first be explained with reference to FIGS. 4-7, each of said figures showing a section of a separator plate 2a, 2b.

The separator plate 2a, 2b has a first laser-surface-treated region 50 with a first passivation layer 52. In the laser-surface-treated region 50, the surface of the separator plate 2a, 2b has been irradiated using an ultrashort-pulse laser, as a result of which an increased charge carrier density could be found in the region 50 or in the first passivation layer 52.

Figure 4:
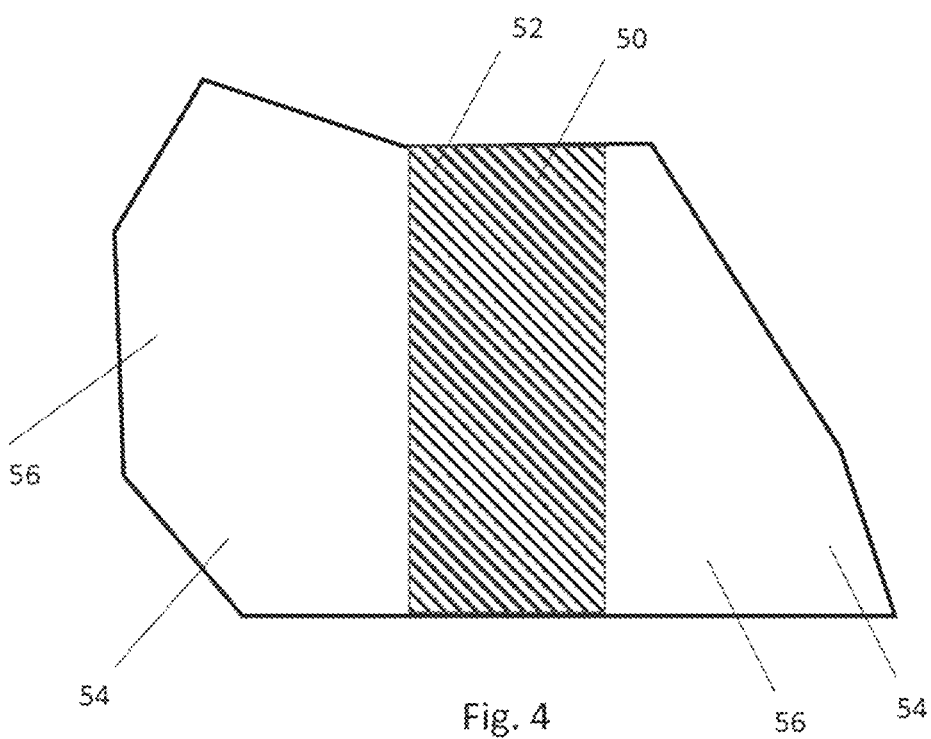
FIG. 4 schematically shows a plan view of one section of a separator plate.

The separator plate 2a, 2b additionally comprises a second region 54 with a native passivation layer 56, cf. FIG. 4. The second region 54 has therefore not been irradiated using the ultrashort-pulse laser and has not undergone any laser surface treatment. The native passivation layer 56 can be understood as a passivation layer that is formed when bare metal oxidizes at the surface, usually due to a reaction with oxygen and water vapor from the ambient air. The native passivation layer 56 is usually formed over the entire surface of the separator plate 2a, 2b and is usually already present on the metal sheet from which the separator plate 2a, 2b is formed. The laser surface treatment in the first region 50 of the separator plate 2a, 2b thus typically takes place on the native passivation layer 56, thereby modifying the electrochemical and physical properties of the native passivation layer 56.

For instance, it has been found that, as a result of the laser surface treatment, the first passivation layer 52 has a charge carrier density that is increased by at least 10% and a surface area that is no more than 5% larger in relation to the native passivation layer 56.

Figure 5:
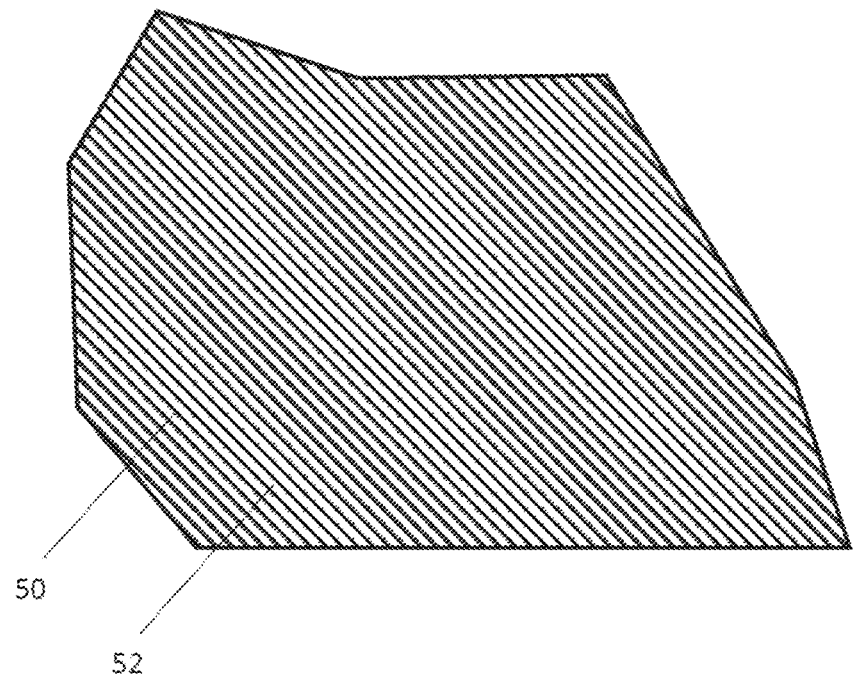
FIG. 5 schematically shows a plan view of one section of a further separator plate.

While the embodiments of separator plate 2a, 2b of FIG. 4 has been laser-surface-treated only in the first region 50, it can be seen in FIG. 5 that the entire surface of the separator plate 2a, 2b has been subjected to the laser surface treatment. The first passivation layer 52 thus extends over the entire surface of the separator plate 2a, 2b of FIG. 5.

Figure 6:
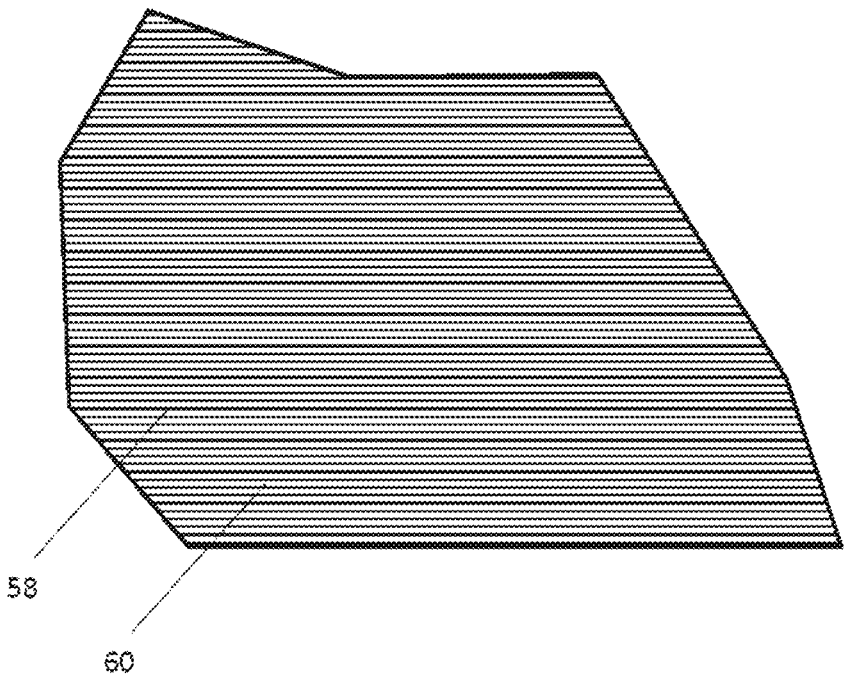
FIG. 6 schematically shows a plan view of one section of a further separator plate.

On the separator plate 2a, 2b of FIG. 5, the first passivation layer 52, which is formed as a result of the laser surface treatment, was removed at least in the section 58, cf. FIG. 6. The removal of the first passivation layer 52 took place electrochemically by applying a voltage in an electrochemical cell. The first passivation layer 52 may be completely removed, but it may also be at least largely removed. A reconstructed passivation layer 60 is then formed. To accelerate the build-up of the passivation layer 60, the plate 2a, 2b may be treated with an acid. Treatment with an alkaline solution is also possible for the accelerated reconstruction of a passivation layer 60. As an alternative, it is possible to wait until the passivation layer 60 forms spontaneously. As a result of the laser surface treatment, the first passivation layer 52 has a charge carrier density that is increased by at least 10% and a surface area that is no more than 5% larger in relation to the reconstructed passivation layer 60.

A Mott-Schottky analysis can be used to determine the charge carrier density in the first passivation layer 52, the native passivation layer 56 and the reconstructed passivation layer 60; details regarding this will be described below.

It may be provided that the first passivation layer 52 has a higher metal oxide and/or metal hydroxide content than the native passivation layer 56 or the reconstructed passivation layer 60. One possible explanation for the increased charge carrier density in the first passivation layer 52 is that the first passivation layer 52 has a greater density of lattice defects, N-type charge carriers and/or P-type charge carriers than the native passivation layer 56 or the reconstructed passivation layer 60.

In the laser-surface-treated region 50, the separator plate 2a, 2b may have periodic surface structures 40 with a mean spatial period of less than 10 μm. The first passivation layer 52 may form at least part of the surface structures 40, namely the uppermost layer thereof. The surface structures 40 may also comprise a material layer located directly below the first passivation layer 52, this material layer comprising the metal of the separator plate 2a, 2b.

The surface structures 40 are therefore arranged at periodic intervals. The periodic surface structures 40 are created on the surface of the separator plate 2a, 2b by irradiation using an ultrashort-pulse laser. For instance, one contiguous region 50 or multiple contiguous regions of the separator plate 2a, 2b may have the periodic surface structures 40. The periodic surface structures 40 will be further explained below with reference to FIGS. 7A to 7H and FIGS. 13-15.

Figure 13:
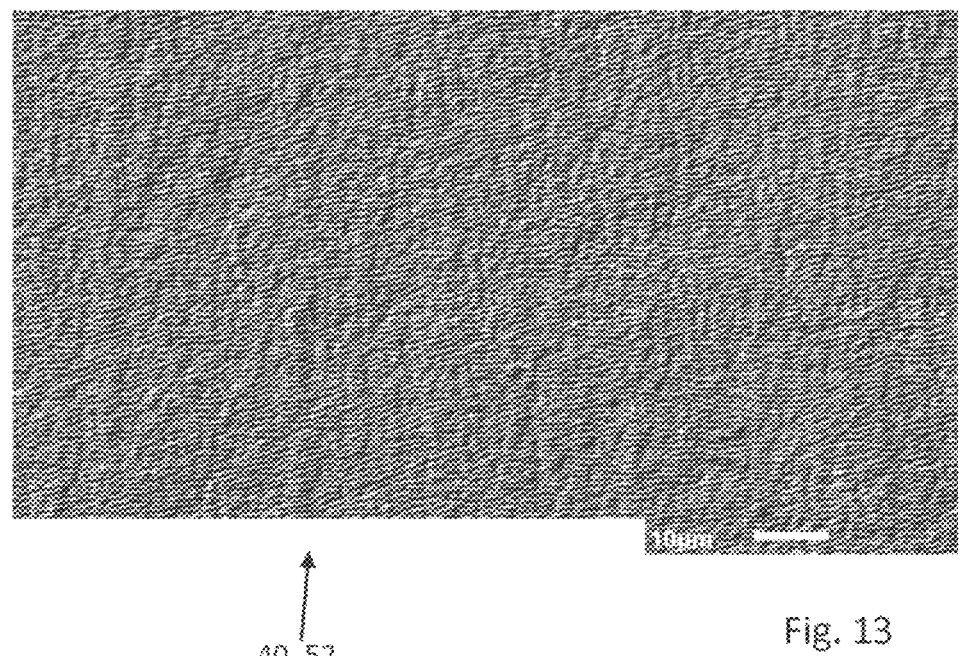
FIG. 13 shows a microscopic image of periodic surface structures in plan view.
Figure 14:
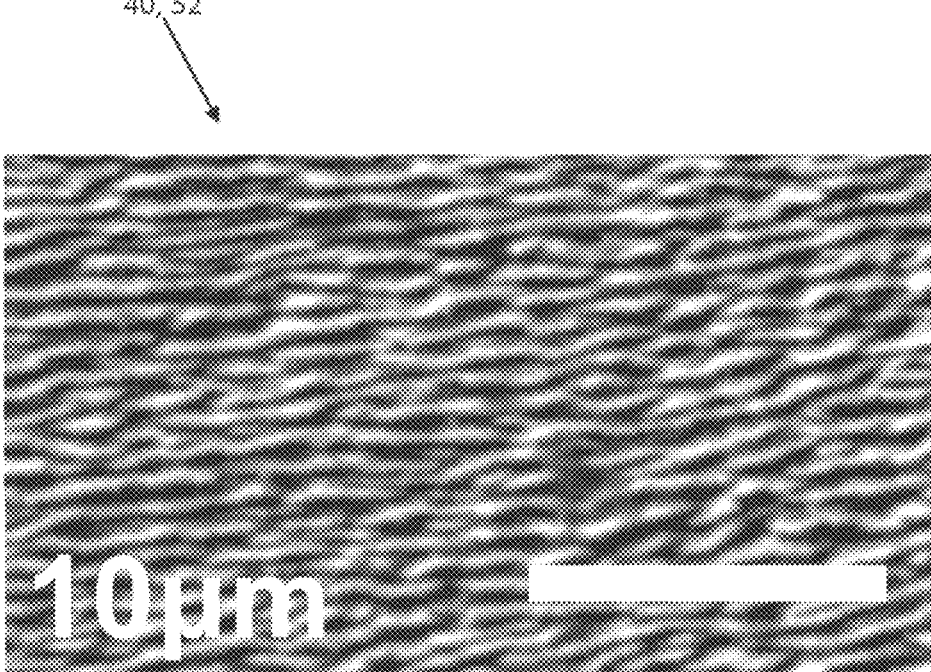
FIG. 14 shows a detail from FIG. 13.
Figure 15:
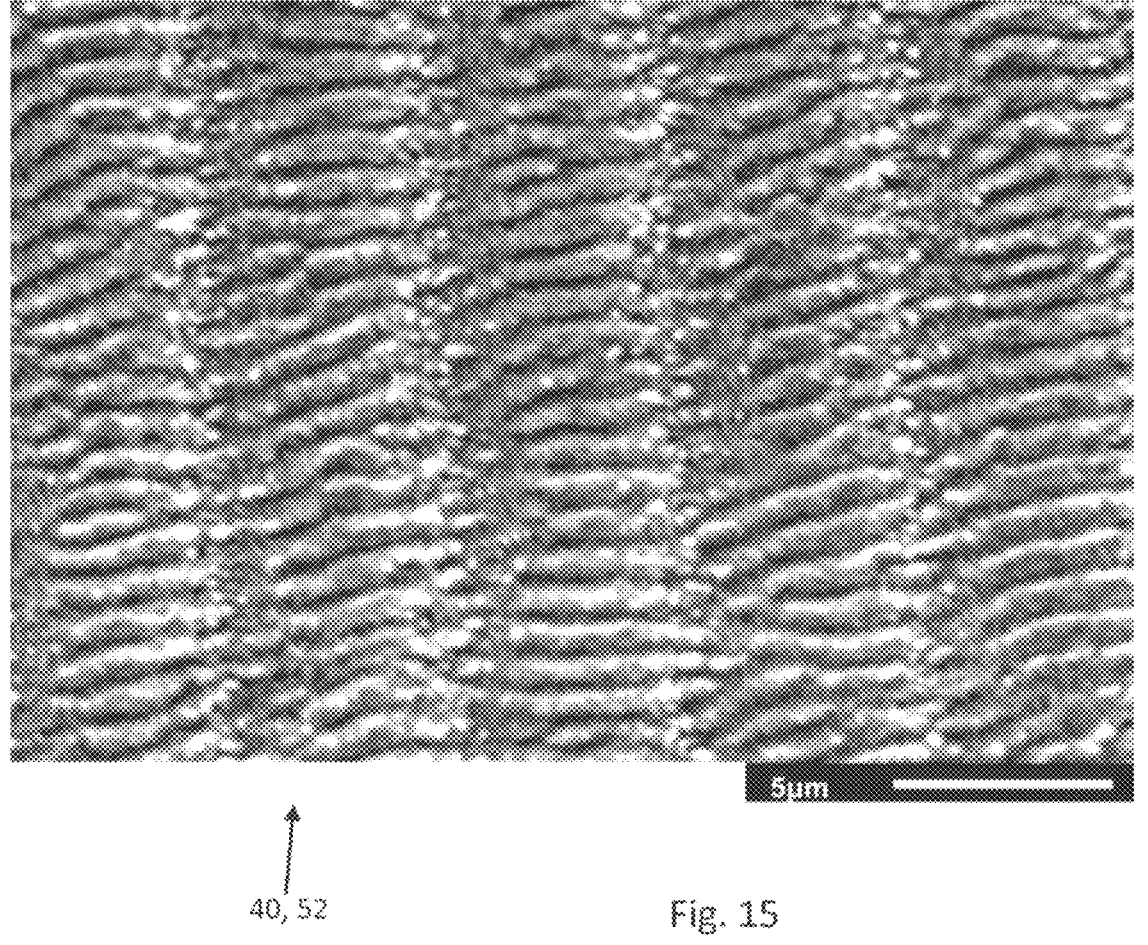
FIG. 15 shows a microscopic image of periodic surface structures in plan view.

FIGS. 13-15 show greatly enlarged images of periodic surface structures 40, which are formed on the surface of a metal sheet, such as a stainless-steel sheet, by a laser surface treatment. The enlarged sections may be sections of surfaces of a separator plate 2a, 2b or of a metal sheet for a separator plate 2a, 2b. The stainless-steel sheet may then be shaped by embossing, hydroforming or deep-drawing in order to form a separator plate 2a, 2b. Alternatively, the separator plate 2a, 2b is first formed by embossing, hydroforming or deep-drawing and then is subjected to the laser surface treatment, as a result of which the periodic surface structures 40 are created (cf. the production method below).

The surface structures 40 may be present on the separator plate 2a, 2b on one and/or both sides, i.e. on the coolant side and/or on the reactant side/gas side.

As can be seen from FIGS. 7A-7H and 13-15, the periodic surface structures 40 (hereinafter: surface structures 40) may comprise a plurality of depressions 42 and elevations 44. The depressions 42 extend between the elevations 44 and are delimited and/or formed by the latter. The surface structures 40 are arranged periodically with respect to one another in at least one spatial direction x, y. For instance, the surface structures 40 may be aligned with one another along their longitudinal direction. For example, the surface structures 40, that is to say the depressions 42 and the elevations 44, extend substantially parallel to one another. The surface structures 40 may be arranged in parallel one next to the other and/or one behind the other. For example, it can be seen in FIGS. 7C, 7F that the surface structures 40 are arranged in parallel one next to the other, i.e. perpendicular to the longitudinal direction of the surface structures. Furthermore, FIG. 15 shows that surface structures 40 can be arranged both in parallel one behind the other (one after the other in the longitudinal direction) and in parallel one next to the other. Such surface structures 40 can likewise be seen in FIGS. 7B and 7H.

Figure 7D:
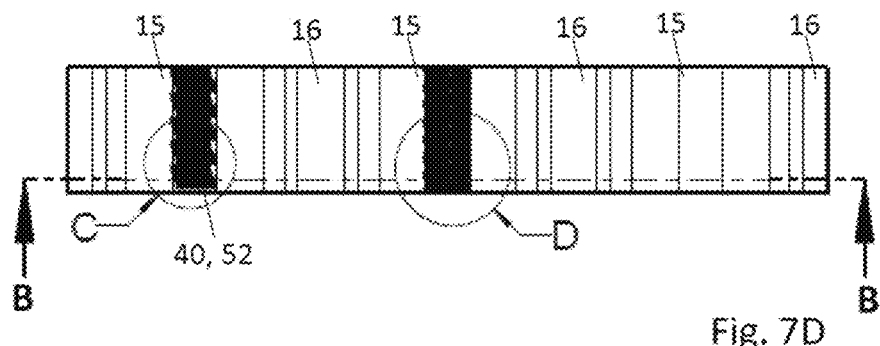
FIG. 7D schematically shows a plan view of the section of the separator plate from FIG. 7A.
Figure 7E:
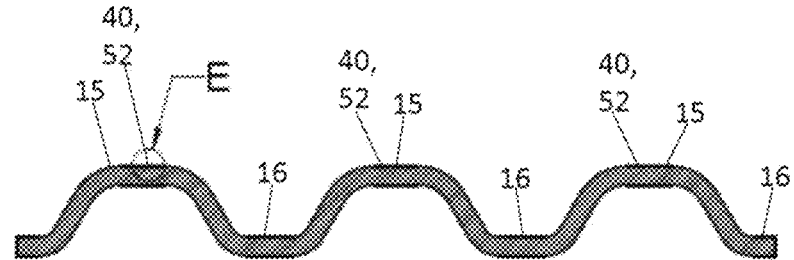
FIG. 7E schematically shows a cross-section of the separator plate along a section line B-B shown in FIG. 7D.
Figure 7F:
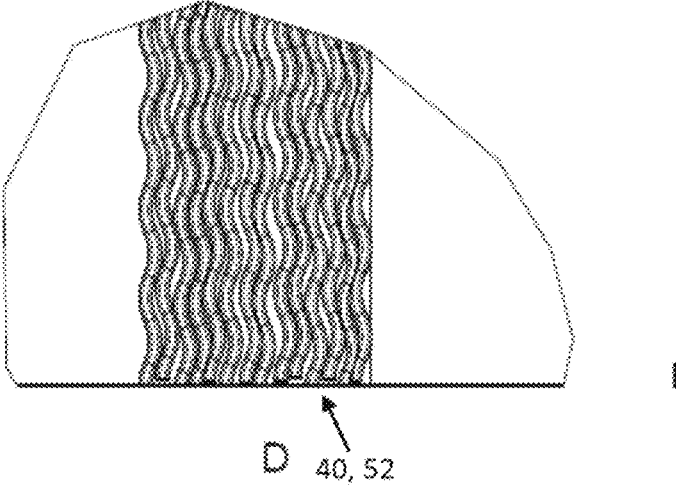
FIG. 7F shows detail D from FIG. 7D.

The surface structures 40 may extend, for example, in a wavy or linear manner along their longitudinal direction. One example of the surface structures 40 extending in a wavy manner is shown in FIGS. 7C and 7F.

Figure 7G:
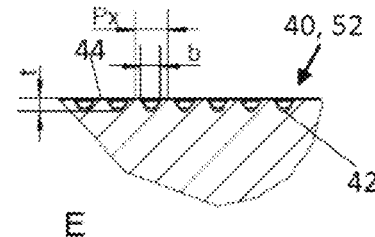
FIG. 7G shows detail E from FIG. 7E.

FIG. 7G shows a depth t, a width b and a period Px of the surface structures, such as of the depressions 42. The surface structures 40 may have a depth t of at least 8 nm, at least 50 nm, and/or at most 3 μm, for example at most 1 μm, at most 500 nm and/or at most 300 nm and/or at most 250 nm. In the present example, the depth is, for example, t=0.4 μm or t=100 nm. Here, a thickness of the first passivation layer 52 is less than 10 nm.

In one exemplary embodiment, the surface structures 40 have a width b of at least 0.1 μm and/or at most 2 μm. In the present example, the width is b=0.45 μm. In addition, the surface structures 40 may have a period Px in one spatial direction x of at least 0.3 μm and/or at most 3 μm. In the present example, the period is 1 μm. In FIG. 7G, the period Px denotes the lateral spacing 10 between two adjacent elevations 44.

Figure 7H:
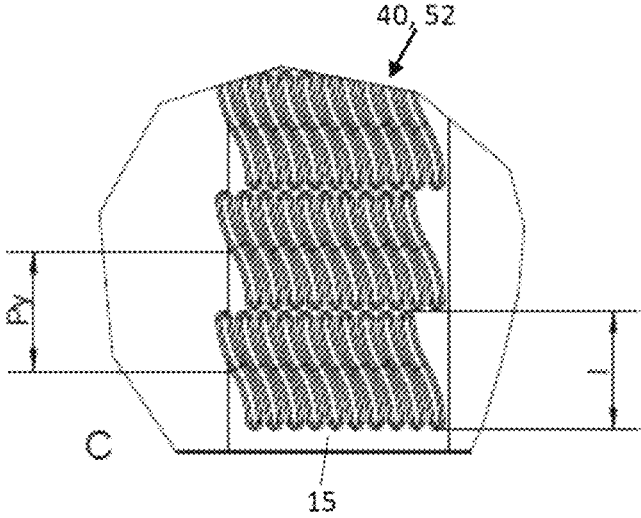
FIG. 7H shows detail C from FIG. 7D.

In FIG. 7H, the surface structures 40 have a length 1 of 5 μm in one spatial direction y. The surface structures are arranged in parallel one behind the other, with a period Py of 5 μm.

Owing to the surface structures 40, the surface of the separator plate 2a, 2b has chemical, electrical and/or mechanical properties that differ from regions of the separator plate 2a, 2b with no surface structures 40. For example, as a result of the surface structures 40, an oxygen content of the surface material of the separator plate 2a, 2b may be greater in the region of the periodic surface structures 40 than outside of the periodic surface structures 40.

In order to create the laser-surface-treated region 50 or the first passivation layer 52 and, if provided, the surface structures 40, use is made of a method comprising the following steps:

providing a metal separator plate 2a, 2b,
  irradiating at least a first region 50 of the separator plate 2a, 2b by means of a pulsed laser, a pulse duration of the laser pulses being less than 100 ps, for example less than 50 ps,
  forming a first passivation layer 52 in the first region 50 of the separator plate 2a, 2b after the irradiation.

As explained above, prior to being irradiated, the first area 50 has a native passivation layer 56. By irradiating the native passivation layer 56 using the ultrashort pulses, which have a pulse length of less than 100 ps, the native passivation layer 56 is modified in such a way that the charge carrier density of the resulting first passivation layer 52 increases by at least 10%, while the surface area increases by no more than 5%.

Figures 16, 17, 18:
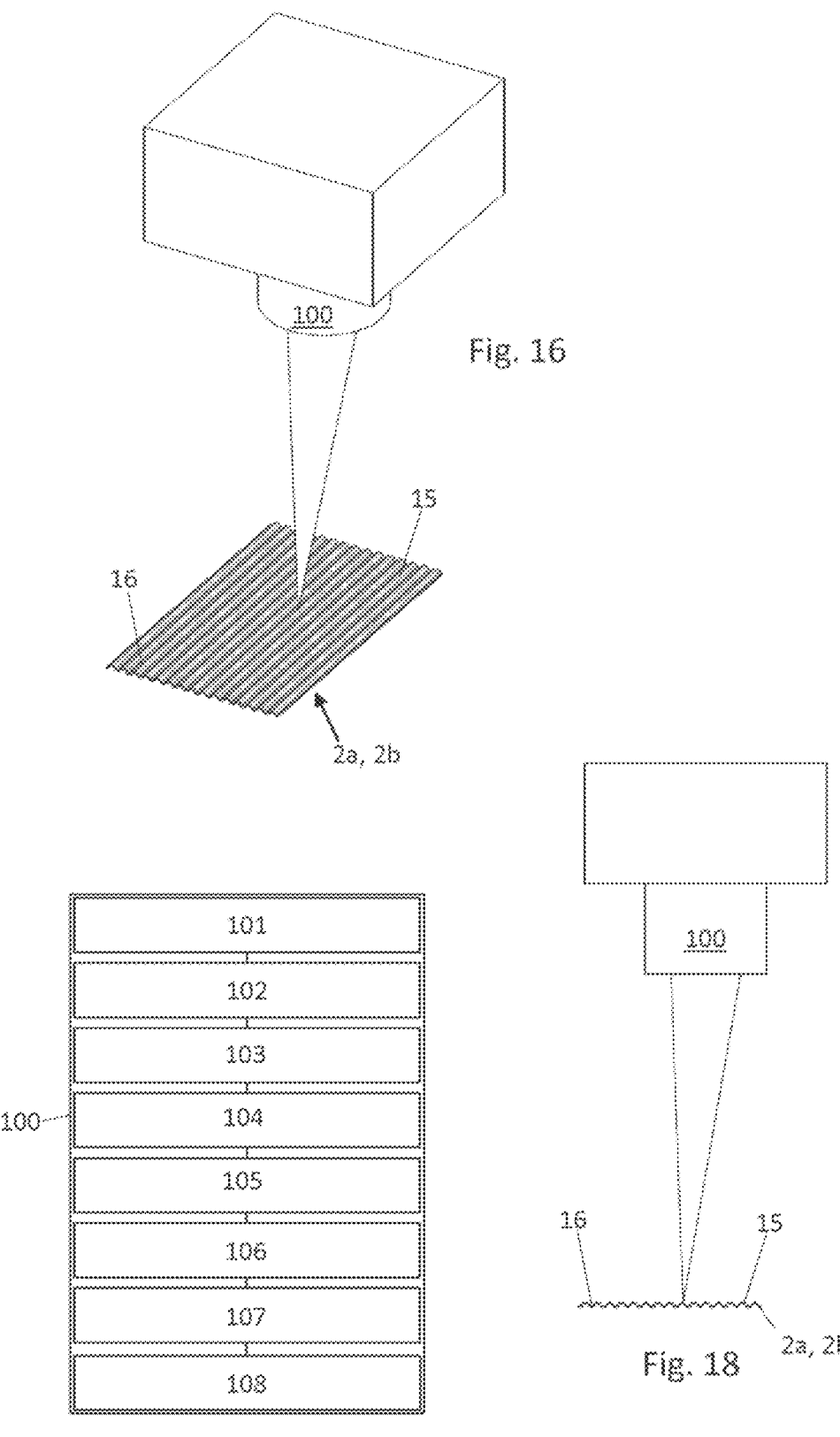
FIG. 16 schematically shows, in a perspective view, a laser system for creating periodic surface structures.
FIG. 17 schematically shows a cross-section of the laser system from FIG. 16.
FIG. 18 shows a detail of the laser system from FIGS. 16 and 17.

The method may be carried out, for example, using a laser 100 or laser system shown in FIGS. 16-18. Each of these figures shows a laser treatment on a section of a separator plate 2a or 2b that has already been provided with channels 16 and webs 15. The treatment could take place analogously in the region of the rear-side webs 19 and the coolant channels formed between these, i.e. on the coolant side of the respective separator plate 2a or 2b. FIG. 17 shows some components of the laser 100, namely a laser head 101, a first mirror 102, a second mirror 103, a λ/2 plate 104, a polarizer, such as a linear polarizer 105, a beam splitter 106, a shutter 107, and a lens 108. Of course, a different setup of the laser 100 is also possible.

For the method, a pulsed laser 100 may be used, wherein each pulse has a pulse duration of less than 1 ns, for example less than 100 ps. The laser 100 may therefore be a picosecond laser (pulse duration shorter than 1 ns and greater than or equal to 1 ps) or a femtosecond laser (pulses shorter than 1 ps, for example shorter than 500 fs and/or greater than or equal to 30 fs). The laser 100 may generate linearly polarized laser radiation. A beam diameter or a smallest lateral size of the laser parallel to the surface of the separator plate 2a, 2b may be for example at least 20 μm and/or at most 2 mm, in the example shown approximately 60 μm. The wavelength λ generated by the laser 100 is for example between 200 nm and 2000 nm, such as between 400 nm and 1500 nm. Customary wavelengths are, for example, 700 to 1000 nm in accordance with a Ti:sapphire laser system; 1064 nm (fundamental wavelength) or 532 nm, 355 nm or 266 nm (frequency multiplication) in accordance with an Nd:YAG laser system. A fluence of the laser may be selected as a function of the material of the separator plate 2a, 2b and may be, for example, at least 0.001, at least 0.01 or at least 0.1 and/or at most 10.0, at most 5.0 or at most 2 J/cm2. The repetition rate of the laser may be, for example, at least 10 Hz, such at least 1 kHz, and/or at most 1000 kHz, for example at most 20 kHz.

The laser beam may be guided parallel to the web direction or perpendicular to the web direction, for example if only the region of the webs 16 or of the rear-side webs 19 is being treated, or else at an angle differing therefrom. For instance, during the laser surface treatment of the rear-side webs 19 of two separator plates 2a, 2b that are to be joined to form a bipolar plate 2, the lasers may be guided for example identically, in opposite directions, or perpendicular to one another.

The method may comprise the additional step:

creating periodic surface structures 40 on the separator plate 2a, 2b by means of the laser radiation.

Höhm 2014 includes a detailed description of the interaction of laser radiation with material in order to create periodic surface structures 40, with advantageous combinations of laser parameters also being published in Höhm 2014.

The creation of this plurality of periodic surface structures 40 is already completed before the next laser pulse hits the surface of the separator plate 2a, 2b. For example, at least 10 or at least 20 surface structures, such as trench structures, may be created per laser pulse. The surface structures 40 are typically oriented perpendicular to the linear polarization direction of the incident laser radiation. The laser 100 may thus be directed onto a surface of the separator plate 2a, 2b in such a way that surface structures 40 that have a desired orientation are created. This may apply to the core regions of the irradiated area. When the laser pulse hits the surface of the separator plate 2a, 2b, the incident laser radiation interferes with an electromagnetic surface wave in the surface material of the separator plate 2a, 2b that is generated by the laser pulse. The periodic surface structures 40 are formed as a result of this interaction.

A mean spatial period Px of the surface structures 40 usually depends on the wavelength λ of the laser 100. For metals (metal sheet, stainless steel sheet), the period P is approximately in the order of magnitude of the wavelength λ. By way of example, the mean spatial period P of the surface structures 40 is at least 2%, at least 5%, at least 20%, and/or at most 200%, for example at most 120% of the laser wavelength used.

In principle, a single laser beam is sufficient to create the surface structures 40. This laser beam can then scan the surface of the separator plate 2a, 2b that is to be treated. In this case, said plurality of periodic surface structures is created by each individual laser pulse within a spatial projection of the laser radiation onto the separator plate. The method can be accelerated if an interference pattern or diffraction pattern is formed by at least two laser beams and the surface is scanned with the interference pattern to create the surface structures 40. To this end, a linearly polarized laser beam of the laser 100 may be split by way of the beam splitter 106. The two linearly polarized partial beams thereby produced are then used to form the interference pattern. The interference pattern of the laser beams that is used serves only to enlarge the scanned surface area and has no direct influence on the periodicity of adjacent surface structures 40. The spatial period of the surface structures 40 thus differs from the spatial period of the interference pattern or diffraction pattern and is usually significantly smaller, for example 10 times smaller. However, comparative measurements have shown that, by means of this surface structuring applied in an accelerated way, the volume resistance cannot be reduced to the same extent as when using just one single laser beam. As an alternative or in addition, a line-type laser can also be used, with the laser line thereof may have a width of at least 20 μm.

For instance, at least the webs 15 and/or the rear webs 19 of the separator plate 2a, 2b are irradiated with the laser 100, as a result of which the surface structures 40 are formed on the webs 15 and/or on the rear webs 19. In this case, the webs 15 and/or rear webs 19 and/or the electrochemically active region 18 of the flow field 17 may be formed either before the laser treatment or after the laser treatment. In other words, the required steps of shaping the flat stainlesssteel sheet to form the separator plate 2a, 2b, such as deep-drawing or embossing, take place before or after the irradiation by means of the laser 100.

A coating may be applied to the separator plate 2a, 2b, or use can be made of a sheet material that is already coated over the entire surface, for example in order to ensure the long-term stability of the separator plate 2a, 2b. The coating may have a thickness of at least 10 nm and/or at most 100 μm, for example at least 50 nm and/or at most 50 μm. For possible materials of the coating, reference is made to the materials above. The coating may contain a thermoplastic or thermosetting binder for applying the coating to the separator plate in liquid form. The full-surface coating may be removed in one or more sections in an additional step. For this, use may be made of the laser 100, or alternatively of another laser that is designed to remove the material of the coating. At least parts of the exposed surface section can then be treated using ultrashort-pulse lasers and can be provided with surface structures.

The first passivation layer 52 discussed in this specification and the surface structures 40 can lead to a considerable reduction in the electrical contact resistance and/or to a considerable increase in the electrical conductivity, for example at the contact areas on the outer sides 22 of the bipolar plate 2, i.e. such as on the webs 15.

Due to this improvement in the electrical conductivity, if the first passivation layer or the surface structuring 40 is present at the contact areas between the separator plates 2a, 2b, i.e. the rear-side webs 19, it is possible to omit the laser-welded sections 24 in the contact zones on the coolant side of the separator plates 2a, 2b. In one embodiment, therefore, the bipolar plate 2 may be free of materially bonded connections, such as laser-welded joints, within the flow field 17 or within the electrochemically active region 18 and in the aforementioned contact zones of the two separator plates 2a, 2b on the coolant side, where the first passivation layer 52 and/or the surface structures 40 are arranged.

To characterize the separator plate 2a, 2b of FIG. 4, use may be made of a method comprising the following steps:

providing a separator plate 2a, 2b, which has a first laser-surface-treated region 50 with a first passivation layer 52 and a second region 54 with a native passivation layer 56, determining a first charge carrier density of the first passivation layer 52, determining a second charge carrier density of the native passivation layer 56, comparing the first charge carrier density with the second charge carrier density.

To characterize the separator plate 2a, 2b of FIG. 5, use may be made of a method comprising the following steps:

providing a separator plate 2a, 2b, which has a first passivation layer 52, determining a first charge carrier density of the first passivation layer 52, removing the first passivation layer 52, reconstructing a passivation layer 60 (cf. FIG. 6), determining a second charge carrier density of the reconstructed passivation layer 60, comparing the first charge carrier density with the second charge carrier density.

The reconstruction of the passivation layer 60 often takes place in a sulfuric acid solution. Furthermore, the removal of the first passivation layer 52 in the section 58 may take place electrochemically.

Figure 8:
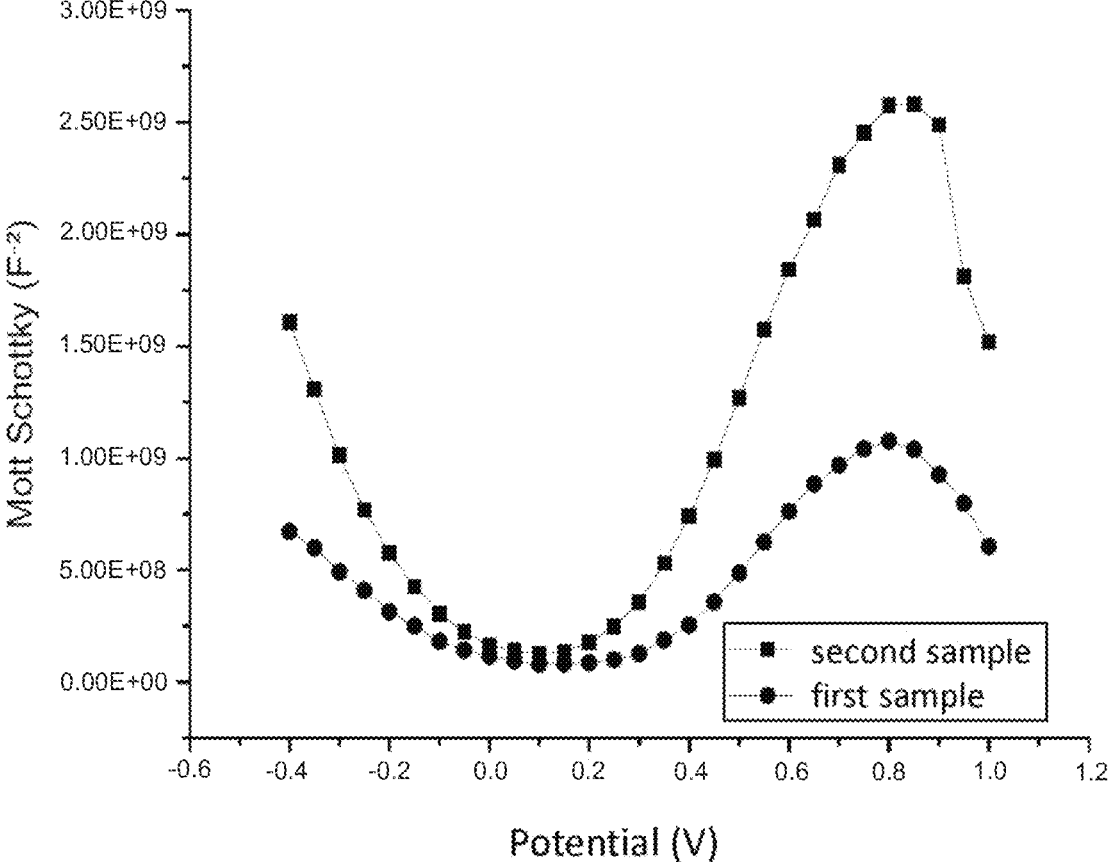
FIG. 8 shows Mott-Schottky measurements on a laser-surface-treated sample and on an untreated sample.
Figure 19:
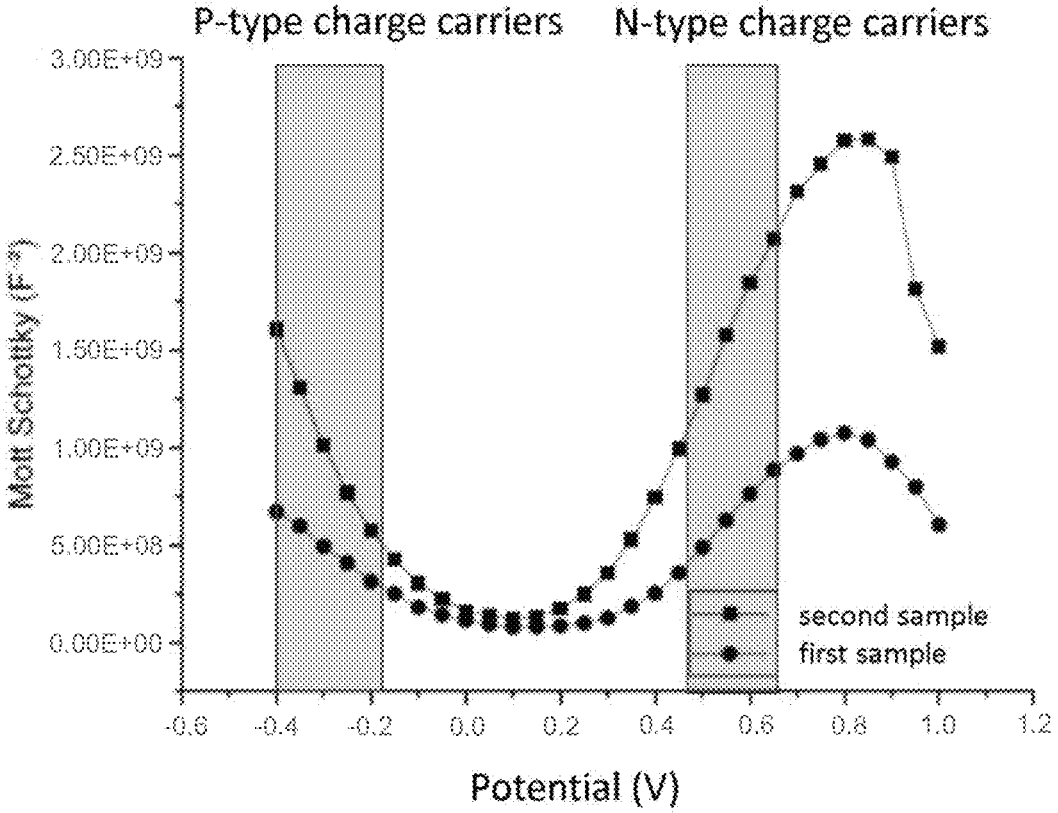
FIG. 19 shows the Mott-Schottky measurements of FIG. 8 with highlighted areas in which the P-type charge carrier density and the N-type charge carrier density are determined.

FIG. 8 and FIG. 19 show comparative measurements on a laser-surface-treated first sample with a first passivation layer 52, e.g. according to FIG. 5, and on a second sample with a reconstructed passivation layer 60, for example according to FIG. 6. Both samples have been analysed by means of a Mott-Schottky analysis. Prior to recording the Mott-Schottky impedance, an OCP (Open Circuit Potential) resting potential measurement is often carried out for several hours, for example 16 hours. For this, use is made of a Mott-Schottky test assembly comprising an electrochemical cell, a working electrode, a counterelectrode, and a reference electrode. Such an assembly is also known as a three-electrode set-up. The electrochemical cell is then excited using an AC voltage potential with a fixed frequency and small signals. Such a Mott-Schottky test assembly can be seen for example in the publication Schmickler, Wolfgang; Santos, Elizabeth "Interfacial Electrochemistry", Springer, 2010, and for this reason there is no need for a further detailed description of the Mott-Schottky test assembly here. The following parameters, for example, are suitable as test parameters for the Mott-Schottky analysis:

Electrolyte: sulfuric acid, pH 2, 20 ppm fluoride, such as potassium fluoride

Test temperature: 25° C.

Frequency of AC voltage (sine voltage): 1 kHz

Amplitude of sine voltage: 20 mV

The charge carrier density of the first sample and of the second sample is determined here by taking into account a Mott-Schottky analysis or a Mott-Schottky plot. A Mott-Schottky analysis generally measures changes that occur at an electrochemical interface when an applied DC voltage is changed. For instance, an impedance is measured at different potential values and is depicted in graph form according to the above-described Mott-Schottky equation (1). The charge carrier density ND can then be determined by analyzing the slope m of the above equation (2). Depending on whether the sample contains N-type charge carriers and P-type charge carriers, the slope of the straight line is positive (for N-type charge carriers) or negative (for P-type charge carriers).

First, the first sample was analysed using the Mott-Schottky method. Here, the first sample comprises a plate made of stainless steel of type 1.4404 with a laser-pretreated first passivation layer 52. The first passivation layer 52 of the first sample was then electrochemically completely removed in the electrochemical cell by a polarization of −400 mV. Since the sample is in acidic solution, a new passivation layer forms on the surface of the stainless steel once the polarization has been switched off, this new passivation layer being referred to in this specification as the reconstructed passivation layer 60. The second sample will hereinafter be understood as the stainless steel plate with the reconstructed passivation layer 60. Alternatively, the second sample may also be formed as a different section, namely a non-laser-treated section, of the same stainless steel plate as the first sample. In this case, the second sample may have a native passivation layer 56 instead of the reconstructed passivation layer 60. Once the reconstructed passivation layer 60 has formed, the second sample is analysed using the Mott-Schottky method.

As indicated above, the plate of the samples used is manufactured from stainless steel. Stainless steel contains, inter alia, chromium and iron, and therefore the corresponding passivation layer 52, 56, 60 contains chromium oxide and iron oxide and can therefore be understood as a double layer. For this reason, the respective passivation layer 52, 56, 60 comprises both N-type charge carriers and P-type charge carriers. Specifically, P-type charge carriers are usually present in chromium oxide, while iron oxide usually contains N-type charge carriers. Since both types of charge carrier are present in the samples, the Mott-Schottky plots of FIG. 8 have a relatively complex course instead of a straight course. However, two areas with a straight course can be defined in each plot, and these can be used to determine the P-type charge carrier density and the N-type charge carrier density. In FIG. 19, these areas are indicated by hatching for the respective P-type charge carriers and the N-type charge carriers. One difference between FIG. 8 and FIG. 19 is therefore the hatched areas. The P-type charge carrier density is characterized by a negative slope, and the N-type charge carrier density is characterized by a positive slope of the Mott-Schottky plot. According to equation (2), the charge carrier density ND and the slope of the Mott-Schottky plot are inversely proportional to each other.

It can be seen in FIG. 8 that, in the area between 0.4 V and 0.7 V, the plot of the first sample has a smaller slope than the plot of the second sample, the latter having a much larger slope in this area. Correspondingly, the plot of the first sample in the area between −0.4 V and −0.2 V is also steeper than the plot of the second sample in the same area.

The first sample thus has both a greater P-type charge carrier density (cf. plots in the area between −0.4 V and −0.2 V) and a greater N-type charge carrier density (cf. plots in the area between 0.4 V and 0.7 V) in the surface layer than the second sample. For the P-type charge carriers, a ratio of charge carrier density in the first passivation layer 52 to charge carrier density in the reconstructed passivation layer 60 of 3.0 was measured. For the N-type charge carriers, a ratio of charge carrier density in the first passivation layer 52 to charge carrier density in the reconstructed passivation layer 60 of 2.1 was measured. In other words, the combined charge carrier density ND (P and N) in the first passivation layer 52 of the first sample is greater overall than the charge carrier density in the reconstructed passivation layer 60 of the second sample. In contrast, only a 1.5% increase for the surface area was measured by means of AFM measurements on the same samples.

Examples of charge carrier densities NP and NN determined on different samples A-C are described in the following Tables 1-3. Sample A has not undergone any laser surface treatment and therefore has a native passivation layer. On the other hand, samples B and C have been treated with laser radiation over the entire surface, and therefore they have a first passivation layer 52.

All the samples originate from the same sheet coil; sample A thus serves for comparison with samples B and C.

TABLE 1

| Charge carrier densities of sample A | | |
|---|---|---|
| Sample A: without laser treatment | $N_P * 10^{21}$ cm$^{-3}$ | $N_N * 10^{21}$ cm$^{-3}$ |
| Native passivation layer | 1.26 | 0.93 |

TABLE 2

| Charge carrier densities of sample B | | |
|---|---|---|
| Sample B: with laser treatment | $N_P * 10^{21}$ cm$^{-3}$ | $N_N * 10^{21}$ cm$^{-3}$ |
| First passivation layer | 5.71 | 3.65 |
| Passivation layer reconstructed after removal | 3.99 | 2.71 |
| Ratio of first passivation layer to reconstructed passivation layer | 1.4 | 1.3 |

TABLE 2-continued

| Charge carrier densities of sample B | | |
| --- | --- | --- |
| Sample B: with laser treatment | $N_P * 10^{21}$ cm$^{-3}$ | $N_N * 10^{21}$ cm$^{-3}$ |
| Ratio of first passivation layer to native passivation layer (sample A) | 4.5 | 3.9 |

TABLE 3

| Charge carrier densities of sample C | | |
| --- | --- | --- |
| Sample C: with laser treatment | $N_P * 10^{21}$ cm$^{-3}$ | $N_N * 10^{21}$ cm$^{-3}$ |
| First passivation layer | 4.22 | 2.44 |
| Passivation layer reconstructed after removal | 1.78 | 1.59 |
| Ratio of first passivation layer to reconstructed passivation layer | 2.4 | 1.5 |
| Ratio of first passivation layer to native passivation layer (sample A) | 3.3 | 2.6 |

Both in sample B and in sample C, the values of NP and NN are lower in the reconstructed passivation layer 60 than in the first passivation layer 52. The decrease in the charge carrier densities NP and NN can be explained by a lower number of defects in the reconstructed passivation layer 60 or a higher number of defects in the laser-treated first passivation layer 52. The ratio between the native passivation layer and the first passivation layer is even more pronounced.

The surface area of the samples or passivation layers 52, 56, 60 alone can be determined or estimated, for example, by means of AFM measurements. Conductive Atomic Force Microscopy (C-AFM) or current-sensitive atomic force microscopy is by contrast a method of atomic force microscopy in which the topography of a material and the electric current flow at the point where the tip makes contact with the surface of the sample are measured simultaneously. The surface area of a sample usually cannot be determined by means of C-AFM.

Figure 9:
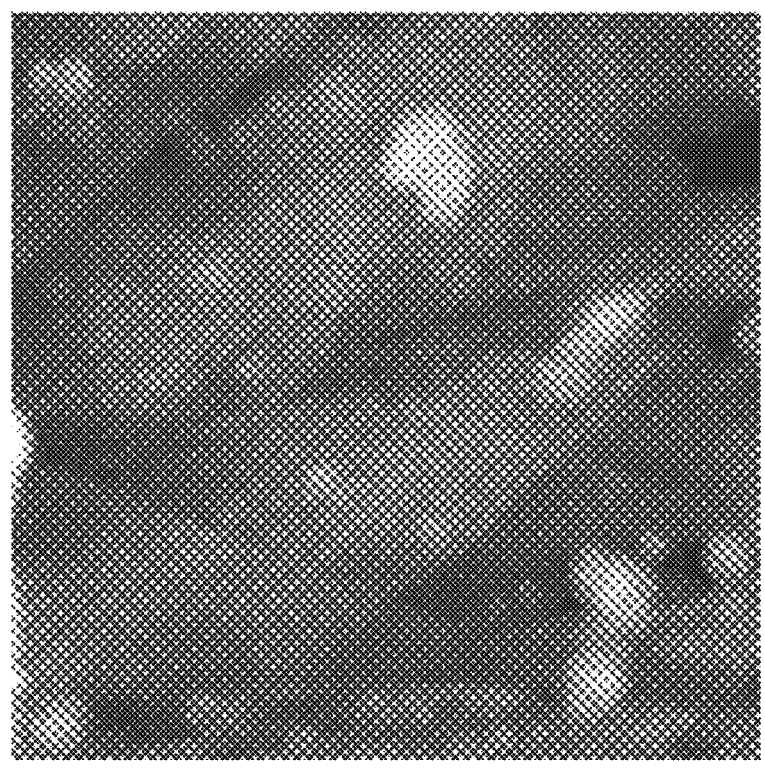
FIG. 9 shows the surface structure of an untreated sample.
Figure 10:
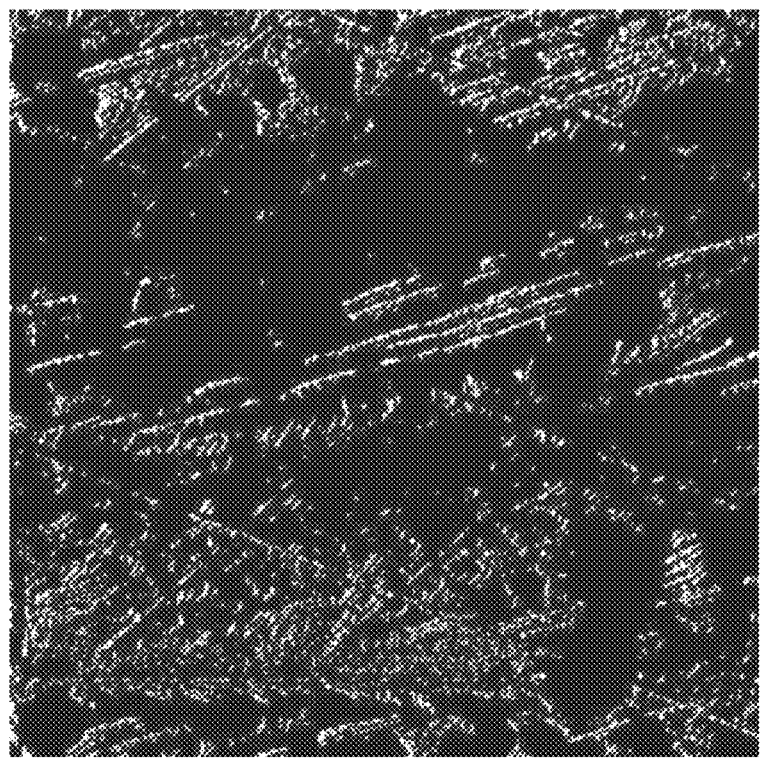
FIG. 10 shows the spatially resolved current density of an untreated sample.

FIG. 9 shows an image of a surface structure of an untreated sample, which has been obtained by means of C-AFM measurements. Here, light areas represent structures of greater height and dark areas represent structures of smaller height. FIG. 10 shows a spatially resolved current density of the untreated sample in the same region as FIG. 9. Here, light areas represent high current densities and dark areas represent low current densities.

Figure 11:
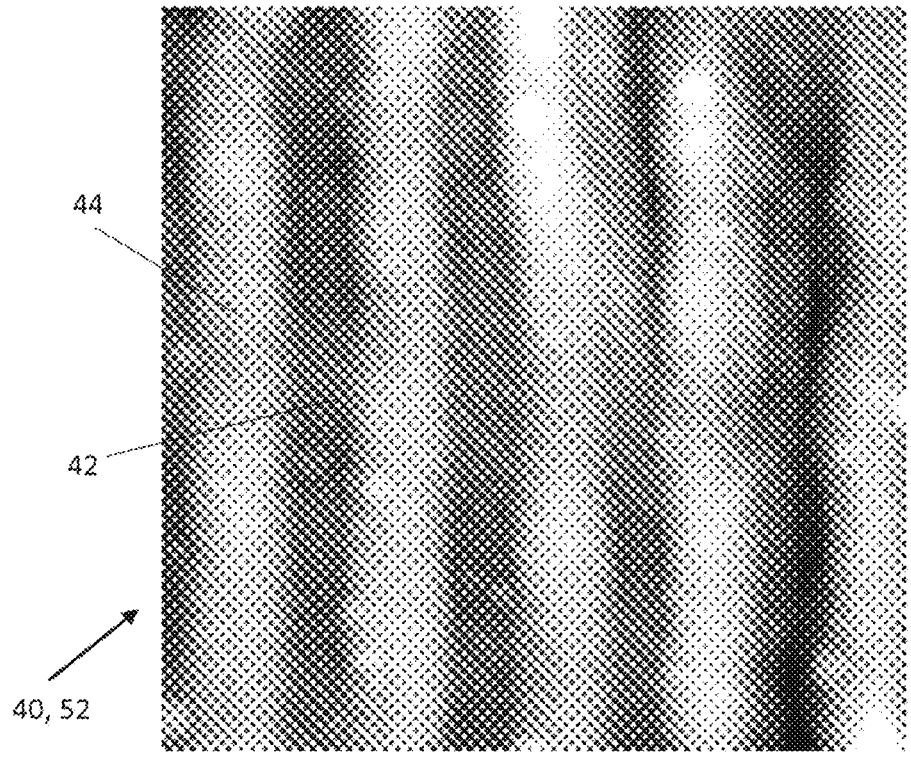
FIG. 11 shows the surface structure of a laser-surface-treated sample.
Figure 12:
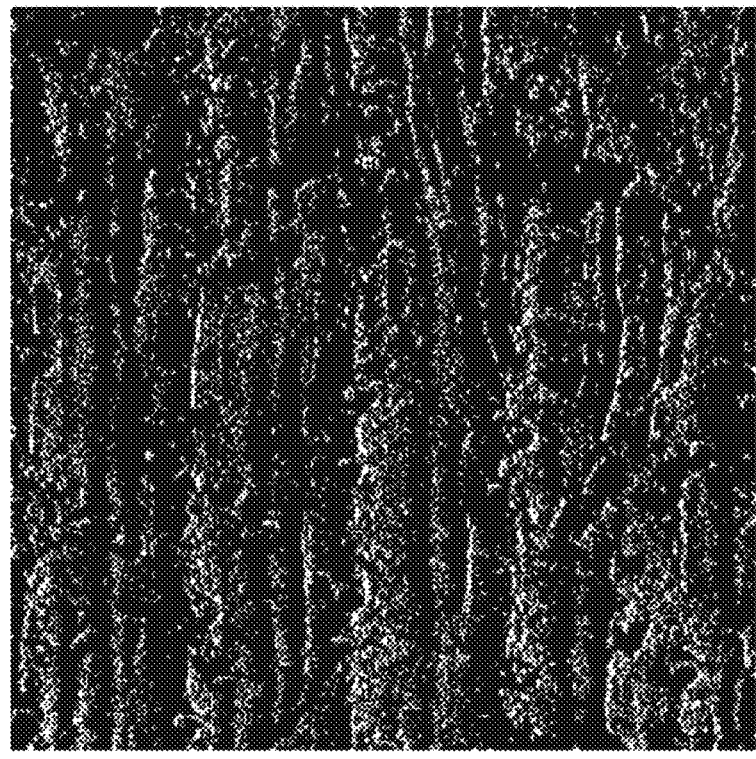
FIG. 12 shows the spatially resolved current density of a laser-surface-treated sample.

FIG. 11 shows an image of a surface structure of a laser-surface-treated sample, which has been obtained by means of C-AFM measurements. Here, light areas represent structures of greater height and dark areas represent structures of lower height. FIG. 12 shows a spatially resolved current density of the laser-surface-treated sample in the same region as FIG. 11. Here, light areas represent high current densities and dark areas represent low current densities.

FIGS. 9-12 each show measurement regions of approximately 5 μm×5 μm. Significant differences can be seen between the sample of FIGS. 9-10 and the sample of FIGS. 11-12. For instance, in the height image of FIG. 11, a trench structure is visible that has periodic surface structures 40 comprising depressions 42 and elevations 44. In the corresponding current image of FIG. 12, it can be seen that maximum measured current densities run along the periodic surface structures 40. In contrast, the surface of the untreated sample is unstructured, which is reflected firstly in an irregular height image of FIG. 9 and secondly in the correspondingly disordered current image of FIG. 10. The mean measured current density in the C-AFM measurements is approximately 1.3 nA for the untreated sample and approximately 2.1 nA for the laser-surface-treated sample. The mean current density of the laser-surface-treated sample is therefore around 1.6 times greater than the mean current density of the untreated sample.

Independently of this, AFM measurements showed that the surface area of the laser-surface-treated sample is no more than 5% larger than the surface area of the untreated sample. By way of example, the surface area of the aforementioned samples can be determined using the following set-up:

Device: JPK NanoWizard BioAFM
   Cantilever: OMCL-AC240-TS-R3 (Olympus, Si tip, radius of the tip: 7 nm)
   Scan area: 100 μm×100 μm, optionally also smaller areas depending on the size of the laser-surface-structured region, but the area may not be smaller than 10 μm×10 μm. The measurement may take place in the rolling direction using the tapping mode.

The real surface can be approximated, for example, by triangulation of the measured height values. As already explained above, the unstructured surface is typically used as a reference to calculate the percentage increase.

The above-described features of the separator plate 2*a*, 2*b* and/or of the methods can of course be combined with one another, provided that they are not mutually exclusive.

FIGS. 1-7, 9-16 and 18 are shown approximately to scale. FIGS. 1-7, 9-16 and 18 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A metal separator plate for an electrochemical system, the metal separator plate comprising:
   at least a laser-surface-treated region with a first passivation layer and a second region with a native passivation layer, wherein the first passivation layer has a higher metal oxide and/or metal hydroxide content than the native passivation layer, and wherein, as a result of the laser surface treatment, the first passivation layer has:
   a charge carrier density that is increased by at least 10%, and
   a surface area that is no more than 5% larger in relation to the native passivation layer.

2. The separator plate according to claim 1, wherein the first passivation layer has a greater density of lattice defects, N-type charge carriers and/or P-type charge carriers than the native passivation layer.

3. A metal separator plate for an electrochemical system, the metal separator plate comprising:
   a first passivation layer on the separator plate and at least part of the first passivation layer laser-surface-treated,
   at least one section having the first passivation layer at least partially removed, and the at least one section having a reconstructed passivation layer, wherein the first passivation layer has a higher metal oxide and/or metal hydroxide content than the reconstructed passivation layer, and
   wherein, as a result of the laser surface treatment, the first passivation layer has:
   a charge carrier density that is increased by at least 10% relative to the reconstructed passivation layer, and
   the at least one section having the first passivation layer at least partially removed is no more than 5% larger in relation to the reconstructed passivation layer.

4. The separator plate according to claim 3, wherein the first passivation layer has a greater density of lattice defects, N-type charge carriers and/or P-type charge carriers than the reconstructed passivation layer.

* * * * *